(12) United States Patent
Kang et al.

(10) Patent No.: US 10,186,009 B2
(45) Date of Patent: Jan. 22, 2019

(54) METHOD FOR CONTROLLING DISPLAY IN ELECTRONIC DEVICE AND ELECTRONIC DEVICE THEREOF

(71) Applicant: Samsung Electronics Co., Ltd., Gyeonggi-do (KR)

(72) Inventors: Seung-Ho Kang, Suwon-si (KR); Mooyoung Kim, Seoul (KR); Sangwon Chae, Seoul (KR); Seungjae Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 15/171,640

(22) Filed: Jun. 2, 2016

(65) Prior Publication Data

US 2016/0358537 A1     Dec. 8, 2016

(30) Foreign Application Priority Data

Jun. 2, 2015   (KR) .................. 10-2015-0077885

(51) Int. Cl.
*G06T 1/20*         (2006.01)
*G09G 3/20*         (2006.01)

(52) U.S. Cl.
CPC ............... *G06T 1/20* (2013.01); *G09G 3/20* (2013.01); *G09G 2320/041* (2013.01); *G09G 2330/021* (2013.01); *G09G 2340/0407* (2013.01)

(58) Field of Classification Search
CPC .............. G06F 9/5094; G09G 2320/00; G09G 2340/0407

See application file for complete search history.

(56) References Cited

U.S. PATENT DOCUMENTS

| 8,683,066 | B2 | 3/2014 | Hurst et al. |
| 2007/0094519 | A1 | 4/2007 | Yamamoto |
| 2009/0021908 | A1* | 1/2009 | Patel ........................ G06F 1/20 361/688 |
| 2014/0324245 | A1* | 10/2014 | Kwon ..................... G06F 1/203 700/299 |
| 2015/0181208 | A1* | 6/2015 | Park ................. H04N 19/00206 375/240.02 |

* cited by examiner

*Primary Examiner* — Thomas Lett

(57) ABSTRACT

The present disclosure relates to a method for controlling a display of an electronic device and a device thereof to adjust a load of the electronic device by adjusting a resolution of the display. An operation method of the electronic device comprises: detecting, by a load detector, an amount of load on the electronic device; analyzing, by a monitoring unit, the detected amount of load and generating a graphic control signal; changing, by a graphic processing unit, a resolution of the electronic device; and displaying, by a display, data reflecting the changed resolution.

20 Claims, 22 Drawing Sheets

METHOD FOR CONTROLLING DISPLAY IN ELECTRONIC DEVICE AND ELECTRONIC DEVICE THEREOF

CROSS-REFERENCE TO RELATED APPLICATION(S) AND CLAIM OF PRIORITY

The present application is related to and claims priority under 35 U.S.C. § 119(a) to an application filed in the Korean Intellectual Property Office on Jun. 2, 2015 and assigned Serial No. 10-2015-0077885, the entire disclosure of which are incorporated herein by reference.

TECHNICAL FIELD

Various embodiments of the present disclosure relate to an electronic device for controlling a display according to a condition of the electronic device and an operation method thereof.

BACKGROUND

Electronic devices may generate heat when continuously performing operations requiring a large amount of computation. The generated heat may increase the surface temperature of the electronic device, causing low-temperature burns, performance degradation, and/or damage of a corresponding element. A temperature sensor may be installed in the proximity of a part which is expected to emit heat to manage a state of components related to the temperature sensor. In addition, when the temperature sensor detects a temperature of a specific condition, the electronic device may directly shut down a system or may cause throttling. The throttling may be performed in a plurality of stages to protect a chipset or prevent inconveniencing the user. Therefore, the heating phenomenon may be mitigated to some extent by reducing central processing unit (CPU) or graphics processing unit (GPU) frequency to a predetermined level during throttling.

A method for controlling heat in an electronic device may include shutting down a system or reducing a processing speed of a processor (frequency) to a predetermined level in a throttling section. The method of shutting down the system may force termination of an application being executed, or terminate operation of the electronic device itself. This method may be undesirable for the user of the electronic device. In addition, reducing the processing speed of the processor to the predetermined level in the throttling section may mitigate the heating phenomenon to some extent, but the performance may be degraded. For example, the method of controlling the clock frequency of the processor may cause performance degradation, such as frame drop, lagging, etc., in an application that may require an instant reaction (for example, a game, 3D contents).

SUMMARY

To address the above-discussed deficiencies, an object of the present disclosure is to solve at least the above-mentioned problems and/or disadvantages and to provide at least the advantages described below. Accordingly, an aspect of the present disclosure provides an electronic device and a method for monitoring an operation which may cause heat or power consumption, and, when performance needs to be degraded, can minimize performance degradation of a system by reducing a throughput of display data of the electronic device.

Another aspect of the present disclosure provides an electronic device and a method, when heat temperature increases during a predetermined time, capable of controlling a heat while minimizing system performance degradation by limiting a throughput of display data.

Another aspect of the present disclosure provides an electronic device and a method, when battery consumption exceeds a set level during a predetermined time, capable of minimizing system performance degradation and control battery consumption by limiting a throughput of display data.

Another aspect of the present disclosure provides an electronic device and a method, when frames per second (FPS) of an application is maintained at an abnormal frame rate during a predetermined time, capable of controlling the FPS of the application while minimizing system performance degradation by limiting a throughput of display data.

Another aspect of the present disclosure provides an electronic device and a method capable of reducing a graphic processing resolution when limiting a throughput of display data due to heat, battery consumption or abnormal FPS.

Another aspect of the present disclosure provides an electronic device and a method for monitoring a function which is operating in a background application, and, when the activated background function influences a foreground function, can execute the background function while minimizing system performance degradation by limiting a throughput of display data.

According to an aspect of the present disclosure, an electronic device comprises: a sensor configured to detect a system performance degradation factor; a display configured to display data of an executed application; and a processor configured to monitor an output of the sensor, and, when the factor monitored during a unit time falls out of a set range, control a resolution of the display data.

According to another aspect of the present disclosure, an operation method of an electronic device comprises: detecting a system performance degradation factor; monitoring the performance degradation factor, and, when the factor monitored during a unit time falls out of a set range, generating a signal to control a display resolution; and displaying by limiting the display resolution of the executed application according to the control signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
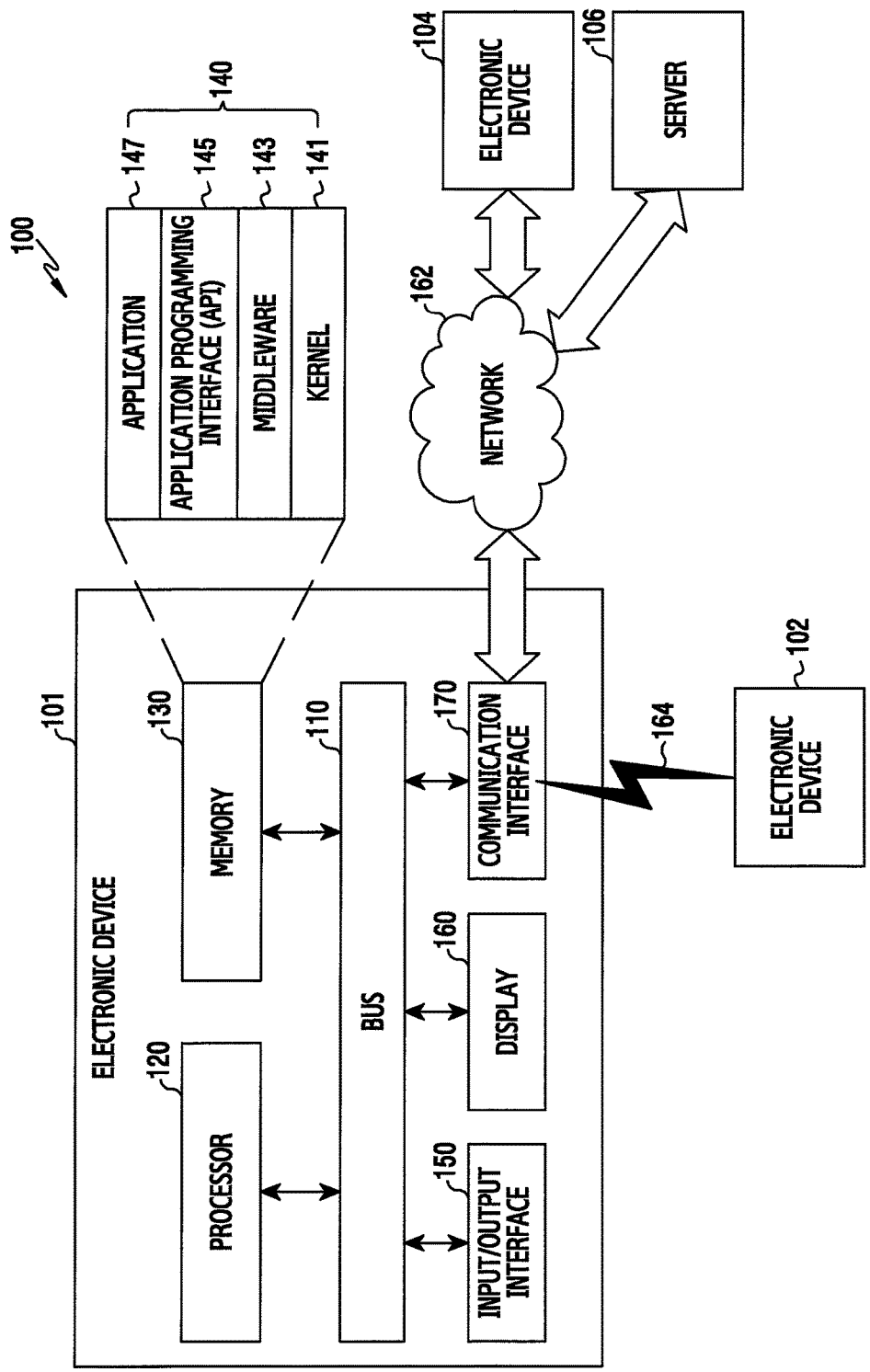
FIG. 1 is a diagram illustrating a network environment comprising an electronic device according to embodiments of the present disclosure.

FIGS. 1 through 20, discussed below, and the various embodiments used to describe the principles of the present disclosure in this patent document are by way of illustration and should not be construed in any way to limit the scope of the disclosure. Those skilled in the art will understand that the principles of the present disclosure may be implemented in any suitably arranged electronic device. Hereinafter, embodiments of the present disclosure are described with reference to the accompanying drawings. In the following description, specific details such as detailed configuration and components are provided to assist the overall understanding of these embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to embodiments of the present disclosure may be at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; a power bank; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a home appliance. For example, of such home appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In other embodiments, an electronic device may be at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global navigation satellite system (GNSS); an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

In embodiments, an electronic device may be at least one of: a piece of furniture or a building/structure; an electronic board; an electronic signature receiving device; a projector; and various measuring instruments (e.g., a water meter, an electricity meter, a gas meter, or a wave meter). Further, it will be apparent to those skilled in the art that an electronic device according to embodiments of the present disclosure is not limited to the above-mentioned devices.

Herein, the term "user" may indicate a person who uses an electronic device or a device (e.g., an artificial intelligence electronic device) that uses the electronic device.

FIG. 1 is a diagram illustrating a network environment comprising an electronic device according to embodiments of the present disclosure.

Referring to FIG. 1, the electronic device 101 in the network environment 100, according to the embodiments, will be described below with reference to FIG. 1. The electronic device 101 may comprise a bus 110, a processor 120, a memory 130, an input/output interface 150, a display 160, and a communication interface 170. In an embodiment, at least one of the elements of the electronic device 101 may be omitted, or other elements may be additionally included in the electronic device 101.

The bus 110 may include, for example, a circuit that interconnects the elements 110 to 170 and transfers communication (e.g., a control message and/or data) between the elements.

The processor 120 may include one or more of a central processing unit (CPU), an application processor (AP), and/or a communication processor (CP). The processor 120 may, for example, perform an operation or data processing on control and/or communication of at least one other element of the electronic device 101.

The memory 130 may include a volatile memory and/or a non-volatile memory. The memory 130 may store, for example, instructions or data (e.g. motion pattern information and motion data) relevant to at least one other element of the electronic device 101. According to an embodiment, the memory 130 may store software and/or a program 140. For example, the program may include a kernel 141, middleware 143, an application programming interface (API) 145, and an application (or application program) 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application 147). Furthermore, the kernel 141 may provide an interface through which the middleware 143, the API 145, or the application 147 may access the individual elements of the electronic device 101 to control or manage the system resources.

The middleware 143, for example, may function as an intermediary for allowing the API 145 or the application 147 to communicate with the kernel 141 to exchange data.

In addition, the middleware 143 may process one or more task requests received from the application 147 according to priorities thereof. For example, the middleware 143 may assign priorities for using the system resources (e.g., the bus 110, the processor 120, the memory 130, or the like) of the electronic device 101, to at least one of the application 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

Examples of the display 160 may include a liquid crystal display (LCD), a light-emitting diode (LED) display, an organic light-emitting diode (OLED) display, a microelectromechanical systems (MEMS) display, and/or an electronic paper display. The display 160, for example, may display various types of content (e.g., text, images, videos, icons, or symbols) to the user. The display 160 may include a touch screen and receive, for example, a touch, gesture, proximity, or hovering input using an electronic pen or a body part of a user.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, long term evolution (LTE), LTE-Advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short range communication 164 may be performed by using at least one of, for example, Wi-Fi, Bluetooth® (BT), near field communication (NFC), and global navigation satellite system (GNSS). The GNSS may include at least one of, for example, a global positioning system (GPS), a global navigation satellite system (GLONASS), a Beidou navigation satellite system (hereinafter, referred to as "Beidou"), and GALILEO (European global satellite-based navigation system). Hereinafter, in the present disclosure, the "GPS" may be interchangeably used with the "GNSS". The wired communication may include at least one of, for example, a universal serial bus (USB), a high definition multimedia interface (HDMI), recommended standard-232 (RS-232), and/or a plain old telephone service (POTS). The network 162 may include at least one of a communication network such as a computer network (e.g., a LAN or a WAN), the Internet, and/or a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic device 102 and the electronic device 104 or the server 106). According to an embodiment, when the electronic device 101 performs some functions or services automatically or in response to a request, the electronic device 101 may make a request for performing at least some functions relating thereto to another device (e.g., the electronic device 102 or the electronic device 104 or the server 106) instead of performing the functions or services by itself or in addition. Another electronic device (e.g., the electronic device 102 or the electronic device 104 or the server 106) may execute the requested functions or the additional functions, and may deliver a result of the execution to the electronic device 101. The electronic device 101 may process the received result as it is or further process the received result to provide the requested functions or services. To achieve this, for example, cloud computing, distributed computing, or client-server computing technology may be used.

Figure 2:
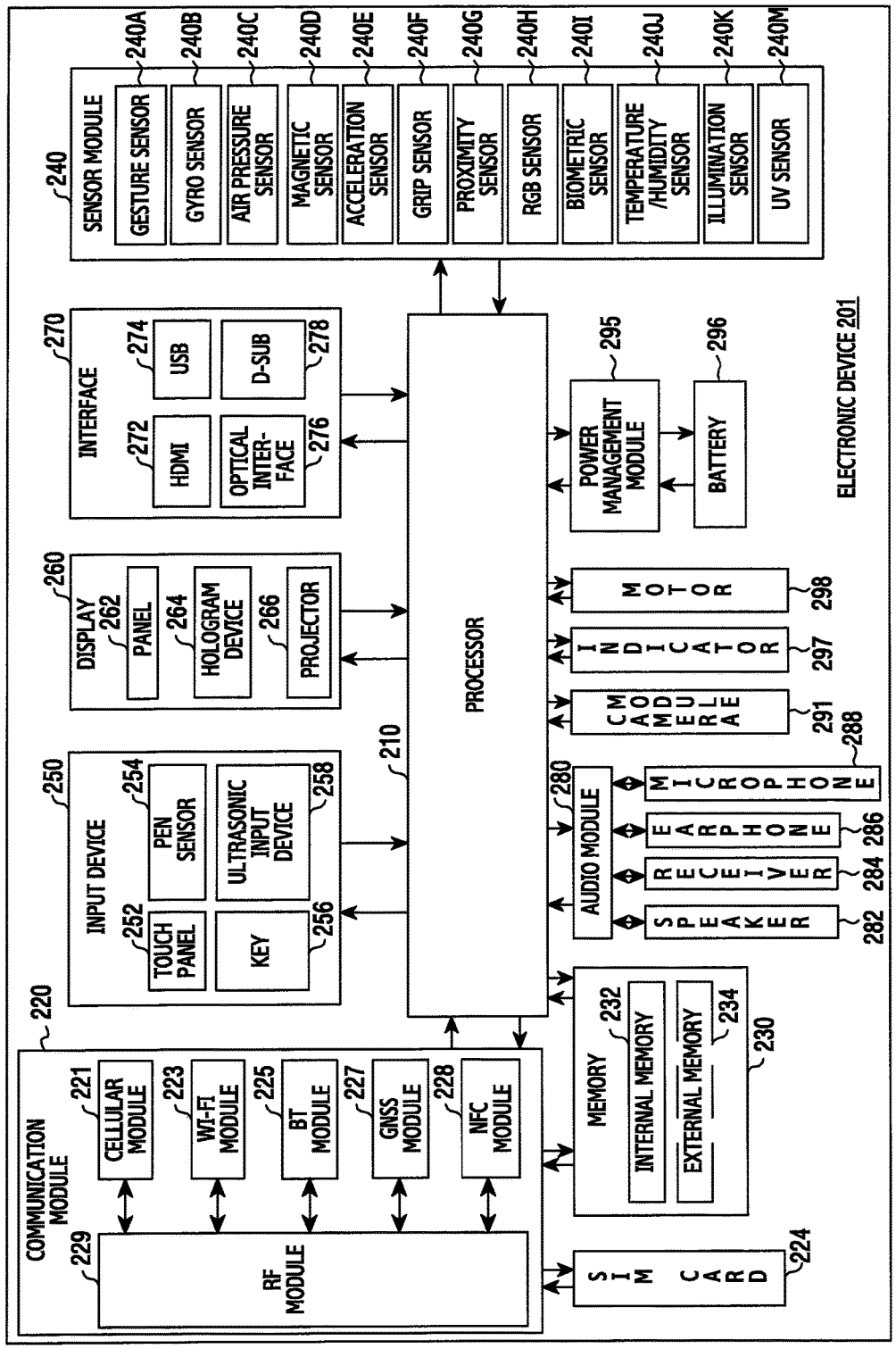
FIG. 2 is a block diagram illustrating an electronic device according to embodiments of the present disclosure.

FIG. 2 is a block diagram of an electronic device according to various embodiments of the present disclosure.

Referring to FIG. 2, the electronic device 201 may comprise, for example, all or a part of the electronic device 101 illustrated in FIG. 1. The electronic device 201 may comprise at least one application processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may, for example, control a plurality of hardware or software elements connected thereto and perform a variety of data processing and calculations by driving an operating system or application programs. The AP 210 may be implemented as, for example, a system on chip (SoC). According to an embodiment, the AP 210 may further include a graphic processing unit (GPU) and/or an image signal processor. The AP 210 may include at least some of the elements (e.g., a cellular module 221) illustrated in FIG. 2. The AP 210 may load commands or data, received from at least one other element (e.g., a non-volatile memory), in a volatile memory to process the loaded commands or data, and may store various types of data in the non-volatile memory.

The communication module 220 may have a configuration that is the same as or similar to that of the communication interface 160 of FIG. 1. The communication module 220 may include, for example, a cellular module 221, a Wi-Fi module 223, a BT module 225, a GPS module 227, an NFC module 228, and a radio frequency (RF) module 229. The communication module 220 provides a function of transmitting/receiving a signal. Accordingly, the communication module 220 may be referred to as a "reception unit", a "transmission unit", a "transmission and reception unit", a "communication unit", or the like.

The cellular module 221 may provide, for example, a voice call, a video call, a text message service, or an Internet service through a communication network. According to an embodiment, the cellular module 221 may distinguish and authenticate the electronic device 201 in the communication network by using a subscriber identification module (e.g., the SIM card 224). According to an embodiment, the cellular module 221 may perform at least some of the functions that the AP 210 may provide. According to an embodiment, the cellular module 221 may include a communication processor (CP).

The Wi-Fi module 223, the BT module 225, the GPS module 227, or the NFC module 228 may include, for example, a processor for processing data transmitted/received through the corresponding module. According to an embodiment, at least some (e.g., two or more) of the cellular module 221, the Wi-Fi module 223, the BT module 225, the GPS module 227, and the NFC module 228 may be included in a single integrated chip (IC) or IC package.

The RF module 229 may, for example, transmit/receive a communication signal (e.g., an RF signal). The RF module 229 may include, for example, a transceiver, a power amp module (PAM), a frequency filter, a low noise amplifier (LNA), or an antenna. According to another embodiment, at least one of the cellular module 221, the Wi-Fi module 223, the BT module 225, the GPS module 227, and the NFC module 228 may transmit/receive an RF signal through a separate RF module.

The SIM card 224 may include, for example, a card including a subscriber identification module and/or an embedded SIM, and may further include unique identification information (e.g., an integrated circuit card identifier (ICCID)) or subscriber information (e.g., international mobile subscriber identity (IMSI)).

The memory 230 may include, for example, an internal memory 232 or an external memory 234. The internal memory 232 may include, for example, at least one of a volatile memory (e.g., a dynamic random access memory (DRAM), a static RAM (SRAM), a synchronous dynamic RAM (SDRAM), or the like) and/or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 234 may further include a flash drive, for example, a compact flash (CF), a secure digital (SD), a micro secure digital (Micro-SD), a mini secure digital (Mini-SD), an extreme digital (xD), a memory stick, or the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a bio-sensor 240I, a temperature/humidity sensor 240J, an illumination sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment, the electronic device 201 may further comprise a processor that is configured as a part of the AP 210 or a separate element from the AP 210 in order to control the sensor module 240, thereby controlling the sensor module 240 while the AP 2710 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an infrared type, and an ultrasonic type. In addition, the touch panel 252 may further include a control circuit. The touch panel 252 may further include a tactile layer to provide a tactile reaction to a user.

The (digital) pen sensor 254 may be, for example, a part of the touch panel, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

The display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using interference of light. The projector 266 may project light onto a screen to display an image. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may, for example, convert a sound into an electrical signal, and vice versa. At least some elements of the audio module 280 may be included in, for example, the input/output interface 140 illustrated in FIG. 1. The audio module 280 may, for example, process sound information that is input or output through the speaker 282, the receiver 284, the earphones 286, the microphone 288, or the like.

The camera module 291 may be, for example, a device that may take a still image or a moving image, and according to an embodiment, the camera module 291 may include one or more image sensors (e.g., a front sensor or a rear sensor), a lens, an image signal processor (ISP), or a flash (e.g., an LED or a xenon lamp).

The power management module 295 may, for example, manage power of the electronic device 201. According to an embodiment, the power management module 295 may include a Power Management Integrated Circuit (PMIC), a charger IC, or a battery or fuel gauge. The PMIC may use a wired and/or wireless charging method. Examples of the wireless charging method may include, for example, a magnetic resonance scheme, a magnetic induction scheme, an electromagnetic wave scheme, and the like. Further, the power management module 295 may further include additional circuits (e.g., a coil loop, a resonance circuit, a rectifier, and the like) for wireless charging. The battery gauge may measure, for example, a residual quantity of the battery 296, and a voltage, a current, or a temperature during the charging. The battery 296 may include, for example, a rechargeable battery and/or a solar battery.

The indicator 297 may indicate a specific state of the electronic device 201 or a part thereof (e.g., the AP 210), for example, a booting state, a message state, a charging state, or the like. The motor 298 may convert an electrical signal into a mechanical vibration, and may generate a vibration effect or a haptic effect. Although not illustrated, the electronic device 201 may comprise a processing unit (e.g., a GPU) for mobile TV support. The processing device for mobile TV support may, for example, process media data according to a standard of digital multimedia broadcasting (DMB), digital video broadcasting (DVB), media flow, or the like.

Each of the components of the electronic device according to the present disclosure may be implemented by one or more components and the name of the corresponding component may vary depending on a type of the electronic device. In various embodiments, the electronic device may comprise at least one of the above-described elements. Some of the above-described elements may be omitted from the electronic device, or the electronic device may further comprise additional elements. Further, some of the elements of the electronic device according to various embodiments of the present disclosure may be coupled to form a single entity while performing the same functions as those of the corresponding elements before the coupling.

Figure 3:
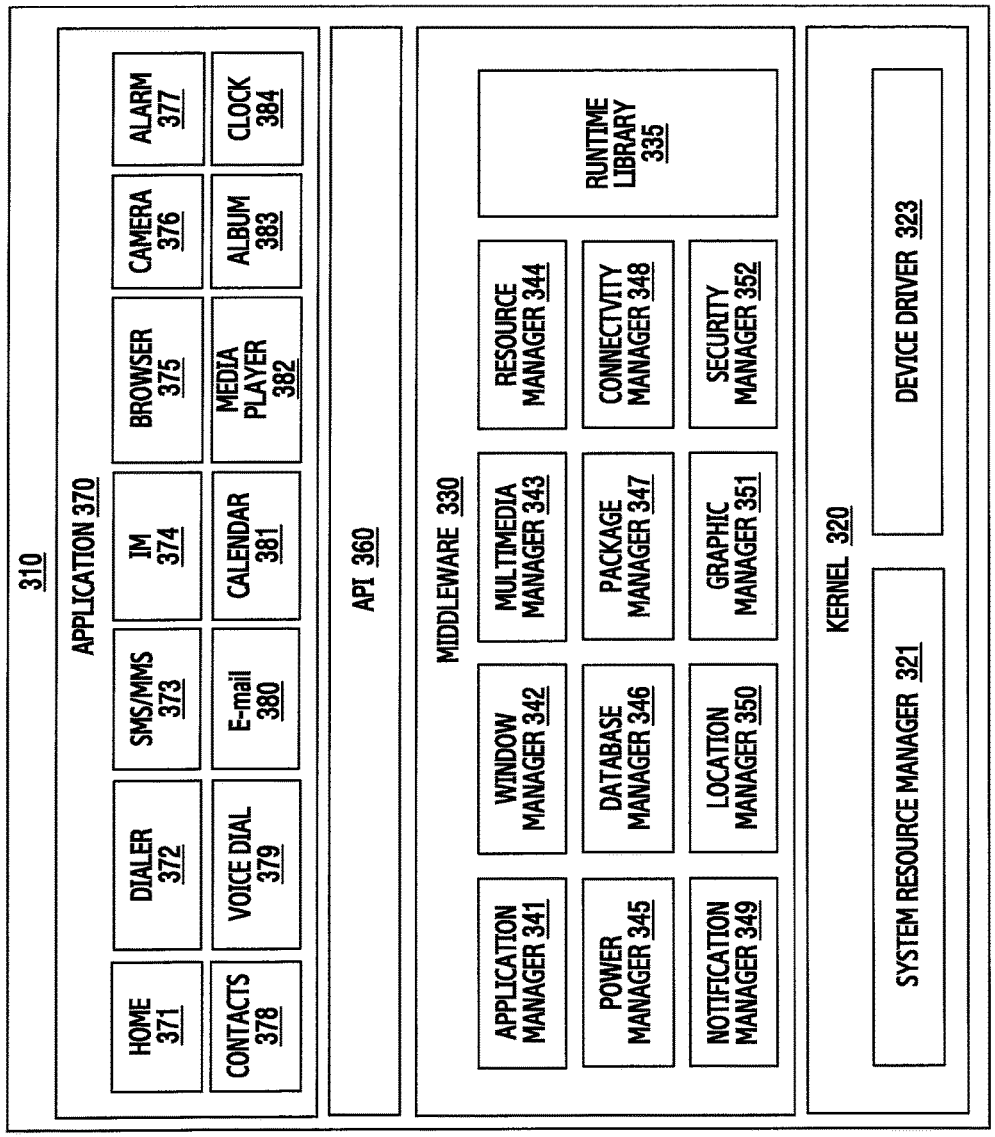
FIG. 3 is a block diagram illustrating a program module according to embodiments of the present disclosure.

FIG. 3 is a block diagram of a program module according to various embodiments of the present disclosure;

According to an embodiment, the program module 310 (e.g., the program 140) may include an operating system (OS) that controls resources relating to an electronic device (e.g., the electronic device 101) and/or various applications (e.g., the application 147) executed in the operating system. The operating system may be, for example, Android®, iOS®, Windows®, Symbian®, Tizen®, Samsung Bada OS®, or the like.

The programming module 310 may include a kernel 320, middleware 330, an application programming interface (API) 360, and/or applications 370. At least some of the program module 310 may be preloaded in the electronic device, or may be downloaded from an external electronic device (e.g., the electronic device 102, the electronic device 104, and the server 106).

The kernel 320 (e.g., the kernel 141 of FIG. 1) may include, for example, a system resource manager 321 or a device driver 323. The system resource manager 321 may control, allocate, or collect system resources. According to an embodiment, the system resource manager 321 may include a process management unit, a memory management unit, or a file system management unit. The device driver 323 may include, for example, a display driver, a camera driver, a Bluetooth driver, a shared-memory driver, a USB driver, a keypad driver, a Wi-Fi driver, an audio driver, or an inter-process communication (IPC) driver.

The middleware 330 may provide a function utilized by the applications 370 in common, or may provide various functions to the applications 370 through the API 360 to enable the applications 370 to efficiently use limited system resources in the electronic device. According to an embodiment, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler in order to add a new function through a programming language during the execution of the applications 370. The run time library 335 may perform input/output management, memory management, or a function for an arithmetic function.

The application manager 341 may manage, for example, a life cycle of at least one of the applications 370. The window manager 342 may manage graphical user interface (GUI) resources used by a screen. The multimedia manager 343 may identify a format for reproducing various media files, and may encode or decode a media file using a codec suitable for the corresponding format. The resource manager 344 may manage resources of at least one of the applications 370, such as a source code, a memory, a storage space, and the like.

The power manager 345 may operate together with, for example, a basic input/output system (BIOS) to manage a battery or power and provide power information for operation of the electronic device. The database manager 346 may generate, search, or change a database to be used by at least one of the applications 370. The package manager 347 may manage installation or update of an application distributed in the format of a package file.

The connectivity manager 348 may manage, for example, a wireless connection, such as Wi-Fi or BT. The notification manager 349 may display or notify of an event, such as a received message, an appointment, and a proximity notification, in such a manner as not to disturb a user. The location manager 350 may manage location information of the electronic device. The graphic manager 351 may manage a graphic effect to be provided to a user, or a user interface related thereto. The security manager 352 may provide all security functions for system security or user authentication. According to an embodiment, in cases where the electronic device (e.g., the electronic device 101) has a telephone call function, the middleware 330 may further include a telephony manager for managing a voice or video call function of the electronic device.

The middleware 330 may include a middleware module that forms combinations of various functions of the aforementioned elements. The middleware 330 may provide specialized modules according to the types of operating systems in order to provide differentiated functions. In addition, the middleware 330 may dynamically delete some of the existing elements, or may add new elements.

The API 360 (e.g., the API 145) may be, for example, a set of API programming functions, and may be provided with different configurations according to operating systems. For example, in the case of Android or iOS, one API set may be provided for each platform, and in the case of Tizen®, two or more API sets may be provided for each platform.

The applications 370 (e.g., the application 147) may include, for example, one or more applications that may provide functions, such as home 371, dialer 372, short message service (SMS)/multimedia message service (MMS) 373, instant message (IM) 374, browser 375, camera 376, alarm 377, contact 378, voice dialer 379, e-mail 380, calendar 381, media player 382, album 383, clock 384, health care (e.g., to measure exercise quantity or blood sugar), or environment information (e.g., atmospheric pressure, humidity, or temperature information).

According to an embodiment, the applications 370 may include an application (hereinafter, referred to as an "information exchange application" for convenience of the description) that supports information exchange between the electronic device (e.g., the electronic device 101) and external electronic devices (e.g., the electronic devices 102 and 104). The information exchange application may include, for example, a notification relay application for transmitting specific information to the external electronic device, or a device management application for managing the external electronic device.

For example, the notification relay application may include a function of transferring, to an external electronic device (e.g., the electronic device 102 or the electronic device 104), notification information generated from other applications of the electronic device (e.g., an SMS/MMS application, an e-mail application, a health management application, or an environmental information application). Furthermore, the notification relay application may, for example, receive notification information from an external electronic device and provide the received notification information to a user. The device management application may, for example, manage (e.g., install, delete, or update) at least one function of an external electronic device (e.g., the electronic device 104) communicating with the electronic device (for example, a function of turning on/off the external electronic device itself (or some elements thereof), or a function of adjusting luminance (or a resolution) of the display), applications operating in the external electronic device, or services provided by the external electronic device (e.g., a telephone call service or a message service).

According to an embodiment, the applications 370 may include an application (e.g., a health care application) specified according to attributes (e.g., attributes of the electronic device such as the type of an electronic device which corresponds to a mobile medical device of the external electronic device (e.g., the electronic device 102 or the electronic device 104). According to one embodiment, the applications 370 may include an application received from an external electronic device (e.g., the server 106 or the electronic device 102 or the electronic device 104). According to an embodiment, the applications 370 may include a preloaded application or a third party application that may be downloaded from a server. The names of the elements of the program module 310, according to the embodiment illustrated in the drawing, may vary according to the type of operating system.

According to various embodiments, at least a part of the programming module 310 may be implemented in software, firmware, hardware, or a combination of two or more thereof. At least some of the programming module 310 may be implemented (for example, executed) by, for example, the processor (for example, the AP 210). At least some of the programming module 310 may include, for example, a module, program, routine, sets of instructions, process, or the like for performing one or more functions.

The term "module" used in the present document, for example, may refer to a unit that includes one of hardware, software, or firmware, or a combination thereof. The "module," for example, may be interchangeably used with the terms, such as a unit, logic, a logical block, a component, or a circuit. The "modules" may be the minimum unit of a component, which is integrally formed, or a portion thereof. The "module" may be the minimum unit, which performs one or more functions, or a portion thereof. The "module" may be implemented mechanically or electronically. For example, the "module" may include at least one of an ASIC (application specific integrated circuit) chip, an FPGA (field-programmable gate array), or a programmable logic device, which is known or will be developed in the future, and which performs some operations.

At least some of the device (e.g., modules or functions) or the method (e.g., operations), according to various embodiments, for example, may be implemented by instructions that are stored, in the form of a program module, in a computer-readable storage medium. One or more processors may perform the function corresponding to the instruction when the instruction is executed by the processor (e.g., the processor 120). The computer-readable storage medium, for example, may be the memory 130.

The computer-readable recording medium may include a hard disk, a floppy disk, a magnetic medium (e.g., a magnetic tape), an optical medium (e.g., a CD-ROM (compact disc read only memory), a DVD (digital versatile disc), or a magneto-optical medium (e.g., a floptical disk)), hardware devices (e.g., a read only memory (ROM), a random access memory (RAM), or a flash memory, or the like). In addition, the program instruction may include a machine language code that is produced by a compiler, as well as a high-level language code that may be executed by the computer by using an interpreter. The above-described hardware device may be configured to operate as one or more software modules in order to perform the operations of various embodiments, and vice versa.

The module or the program module, according to various embodiments, may: include one or more elements described above; exclude some of them; or further include other elements. The operations performed by the module, the program module, or other elements, according to various embodiments, may be executed in a sequential, parallel, iterative, or heuristic method. In addition, some operations may be executed in a different order, or may be omitted, or other operations may be added. In addition, the embodiments disclosed in the present document are intended for the explanation and understanding of the technical matter, and shall not limit the scope of the technology described in the present document. Accordingly, the scope of the present disclosure should be construed to encompass all modifications or various other embodiments based on the technical concept of the present disclosure.

In addition, the embodiments disclosed in the present document are intended for the explanation and understanding of the disclosed technical matter, and shall not limit the scope of various embodiments of the present document. Therefore, the scope of various embodiments of the present document should be construed to encompass all modifications or various other embodiments based on the technical concept of the various embodiments of the present disclosure.

Heat, battery consumption, a change in FPS, an activate state of a background task, etc. may be a factor which causes performance degradation in an electronic device. The electronic device may monitor the performance degradation factor, and, when the performance degradation factor falls out of a set range, limit some of the functions of the electronic device. The method for limiting the functions of the electronic device according to various embodiments may be a method which controls a display function by controlling a graphic load of the function. According to various embodiments, the method for controlling the display function by controlling the graphic load may be a method which reduces or increases a resolution of display data. According to various embodiments, when the performance degradation factor falls outs of the set range (for example, exceeds the set range), the electronic device may predict that the system performance degradation will be caused and reduce the resolution of graphic processing data. In addition, when the system performance degradation factor is solved, the electronic device may restore the display data to the previous graphic processing resolution, and process the display data.

Figure 4:
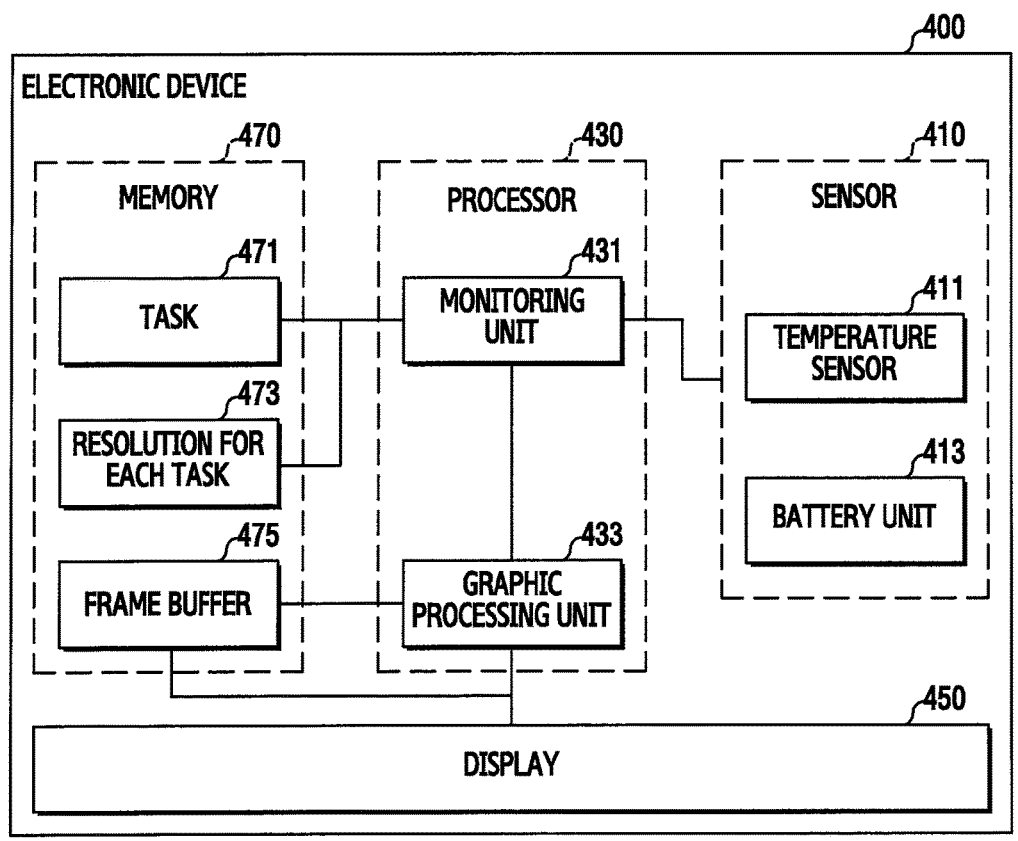
FIG. 4 is a view illustrating a configuration of an electronic device according to embodiments of the present disclosure.

FIG. 4 is a view illustrating a configuration of an electronic device according to various embodiments. According to an embodiment, the electronic device 400 may include a sensor 410 which detects a factor that may cause system performance degradation, a processor 430 which monitors an output of the sensor, and, when the factor monitored during a unit time falls out of a set range, controls a resolution of display data, and a display 450 which displays data of an executed application. In addition, the electronic device may further include a memory 470 which stores a resolution table for each task.

Referring to FIG. 4, the sensor 410 may detect at least one performance degradation factor of the device. The performance degradation factor of the device may be heat, battery consumption, and the like of the device. According to embodiments, the sensor 410 may include a temperature sensor 411 and/or a battery unit 413, and the like. The temperature sensor 411 may be mounted in the electronic device to detect heat temperature of the device. The temperature sensor 411 may be installed in the proximity of a part which causes heat in the electronic device. The battery unit 413 may measure battery consumption (state of charge of a battery) of the electronic device. The battery unit 413 may detect a change in the state of charge of the battery accompanied by battery consumption. The electronic device may analyze an output of the battery unit 413 and detect the battery consumption and the state of charge of the battery which are changed per unit time. The sensor 410 may further include sensors for detecting a performance degradation factor of the device in addition to the temperature sensor 411 and/or the battery unit 413. The processor 430 may include a monitoring unit 431 and/or a graphic processing unit 433, and the like. The monitoring unit 431 may monitor the device performance degradation factor which occurs in the sensor 410, etc. In addition, the monitoring unit 431 may monitor the device performance degradation factor which cannot be detected by the sensor 410, such as a change in FPS, an active state of a background task, and the like. The monitoring unit 431 may generate a control signal for limiting the performance of the device when a result value of the monitoring falls out of a set range. The method for controlling the performance of the device may include limiting a display resolution of the display 450.

The monitoring unit 431 may monitor a currently executed application. The monitoring unit 431 may monitor heat temperature or battery consumption which is outputted from the sensor 410 during a set unit time. In addition, the monitoring unit 431 may monitor a graphic load average value of the executed application during a unit time. In addition, the monitoring unit 431 may monitor a foreground task and a background task, and monitor whether the background task is activated or not. When the heat temperature, the battery consumption, or the change in the FPS falls out of a set reference range during the unit time, the monitoring unit 431 may generate a display control signal for controlling the resolution.

The graphic processing unit 433 may display information according to a graphic load of the application which is being currently processed. In addition, the graphic processing unit 433 may adjust the graphic load according to the display control signal outputted from the monitoring unit 431. Herein, the graphic load may be the display resolution. Adjusting the graphic load may be adjusting the display resolution, which may be reducing or increasing the resolution.

The display 450 may include a display driver interface (DDI) module for interfacing display data outputted from the graphic processing unit 433, a display module, etc. The display module may be a liquid crystal display (LCD) or organic light emitting diode (OLED) module. In addition, in the case of the LCD module, the display 450 may further include a backlight module. The display 450 may display the display data of the application which is executed under the control of the graphic processing unit 433. The display resolution may be determined by the resolution of the display data transmitted from the graphic processing unit 433.

The memory 470 may store a program and data which is generated while the program is being performed. The memory 470 may store a task 471 which was executed or is being executed. The memory 470 may store a resolution table 473 for each of the tasks which were executed or are being executed. The resolution table 473 of the memory 470 may store a resolution value of an application which is changed under the control of the processor 430. The processor 430 may store a resolution value which is changed while an application is being executed in the resolution table, and may store a corresponding resolution value in the resolution table after the execution of the application is terminated. Accordingly, the resolution table of the memory 470 may update and store the resolution value of the application at the time when the resolution value is changed or the execution of the application is terminated. The memory 470 may include a frame buffer 475. The frame buffer 475 may serve to temporarily store video information which will be displayed on the display 470.

Figure 5:
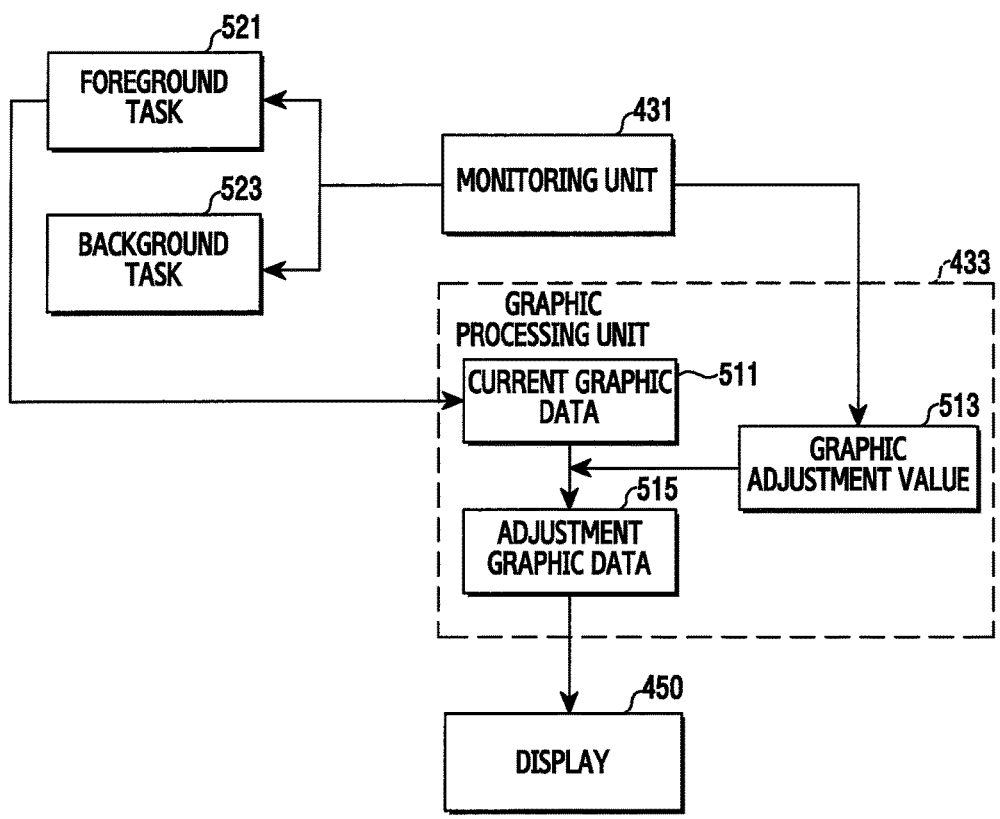
FIG. 5 is a view illustrating an operation of controlling a graphic load in the electronic device according to embodiments of the present disclosure.

FIG. 5 is a view illustrating an operation of controlling a graphic load in the electronic device according to various embodiments.

Referring to FIG. 5, the monitoring unit 431 may monitor a change in the state of a terminal according to an operation of a foreground task 521 (or application). In addition, the monitoring unit 431 may monitor whether a background task 523 (or application) is activated or not. The foreground task may be one or more applications (or tasks) which are directly represented on the display 450 of the electronic device. For example, the foreground task may be reproduction of a game, 3D contents, etc. The background task may be an application which is not displayed on the display 450, but is activated according to a set condition (an event trigger, e.g., pop-up, notification) or a periodic operation (periodic wave-up e.g., synchronization, scheduling, etc.).

The monitoring unit 431 may monitor the state of the terminal while the foreground task is being executed. Herein, the state of the terminal may include at least one of a change in temperature (a change in heat temperature) during a unit time, a change in a battery level (a change in battery consumption) during a unit time, or a change in FPS during a unit time. Herein, the unit time may refer to a time during which the state of the terminal is determined as being changed. According to embodiments, when the change in the state of the terminal exceeds a specific reference during a set time, the electronic device may predict that the performance of the terminal will be changed and generate a display control signal for adjusting a graphic load. For example, the change in the state of the terminal may occur when temperature monitored during a unit time exceeds a set temperature range, when a level of the battery (a state of charge detected with battery consumption) monitored during a unit time is reduced to be lower than a set reference, or when FPS is lower than set minimum FPS. In addition, when the state of the terminal is restored to a normal level, the monitoring unit 431 may generate a display control signal to control the corresponding application to process display data according to a normal graphic load.

The monitoring unit 431 may monitor the active state or non-active state of the background application. The operation of monitoring the background application may be an operation of monitoring a function operation period (for example, a wake up alarm, etc.) or an operation of monitoring an event operation pattern (for example, pop-up, notification, application synchronization, and the like). When an activated application from among the background applications is monitored, the monitoring unit 431 may analyze performance degradation of the executed foreground application which is caused by the active state of the background application. The monitoring unit 431 may generate a display control signal for controlling the graphic load of the foreground application (for reducing the display resolution) as much as the performance degraded according to the result of the analyzing. In addition, when the non-active state of the background application is monitored, the monitoring unit 431 may generate a display control signal for restoring to the graphic load of the previous state (for increasing the display resolution).

The graphic processing unit 433 may generate adjustment graphic data 515 based on a graphic adjustment value 513 generated in the monitoring unit 431. The graphic processing unit 433 may have current graphic data 511 based on the operation of the foreground application. The graphic processing unit 433 may determine the graphic adjustment value 513 according to a display control signal outputted from the monitoring unit 431. In this case, the display control signal outputted from the monitoring unit 431 may determine the graphic adjustment value 513 according to the result of monitoring of the performance degradation factor. In this case, the graphic adjustment value 513 may be a value for reducing, increasing, or maintaining the resolution according to the result of monitoring. The graphic processing unit 433 may generate the adjustment graphic data 515 by reflecting the graphic adjustment value 513 on the current graphic data 511. In addition, the graphic processing unit 433 may forward the adjustment graphic data 515 to the display 450.

Figure 6:
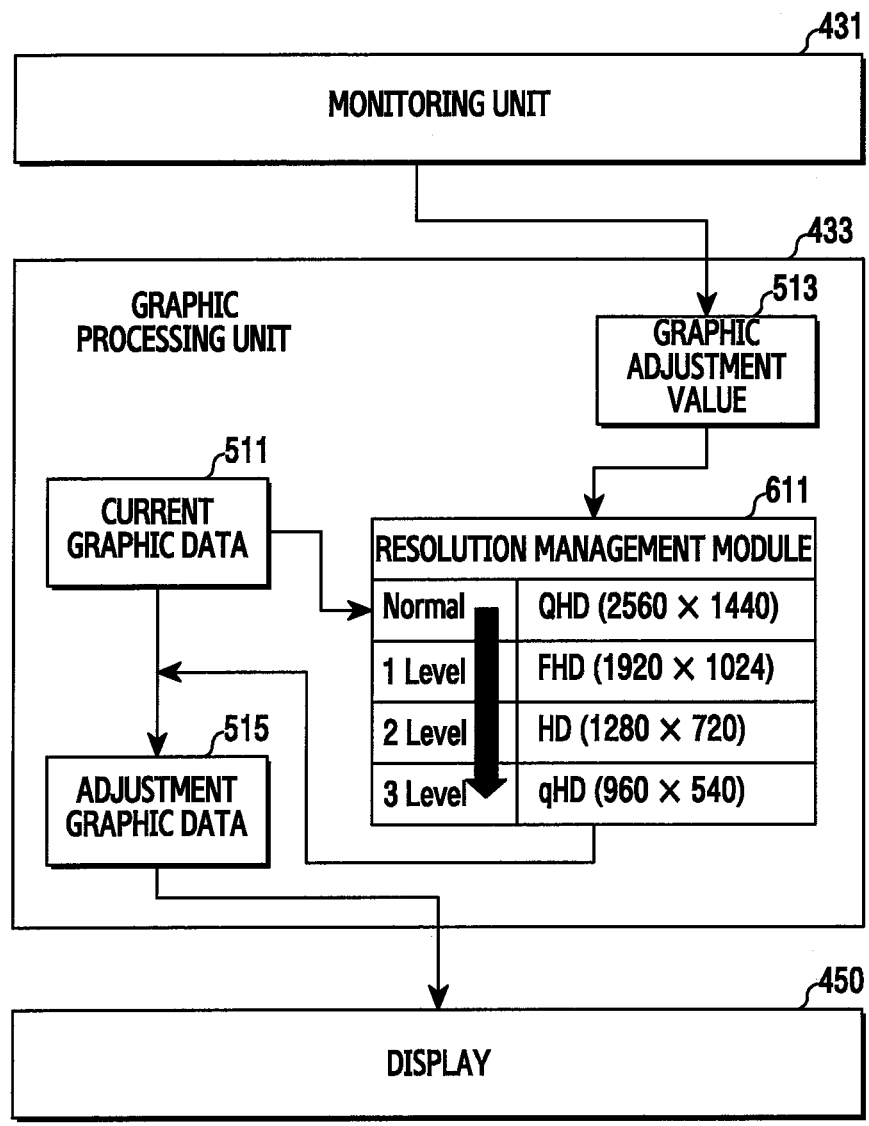
FIG. 6 is a view illustrating an operation of controlling, by a graphic processing unit, a graphic data value in the electronic device according to embodiments of the present disclosure.

FIG. 6 is a view illustrating an operation of controlling, by the graphic processing unit 433, a graphic data value in the electronic device according to embodiments.

Referring to FIG. 6, the graphic processing unit 433 may determine the adjustment graphic data 515 by reflecting a graphic adjustment value 513 outputted from the monitoring unit 431 on the current graphic data 511. In this case, the adjustment graphic data 515 may be determined using a resolution management module 611. For example, when the current graphic data 511 is a normal resolution (for example, a quad high definition (QHD) resolution) and the graphic adjustment value 513 (which may be a display control signal) is a value for reducing by 1 level, the graphic processing unit 433 may determine a full high definition (FHD) resolution which is lower than the normal resolution by 1 level as the adjustment graphic data 515. In addition, when the current graphic data 511 is the normal resolution (for example, the QHD resolution) and the graphic adjustment value 513 (which may be a display control signal) is a value for reducing by 2 levels, the graphic processing unit 433 may determine an HD resolution which is lower than the normal resolution by 2 levels as the adjustment graphic data 515. To the contrary, when the current graphic data 511 is the HD resolution and the graphic adjustment value 513 (which may be a display control signal) is a value for increasing by 1 level, the graphic processing unit 433 may determine the FHD resolution which is higher than the HD resolution by 1 level as the adjustment graphic data 515. The graphic processing unit 433 may process display data of an executed application based on the adjustment graphic data 515, and output the display data to the display 450.

According to embodiments of the present disclosure, the monitoring unit 431 of the electronic device may continue to generate a display control signal for controlling a graphic data throughput (for example, a graphic adjustment value for doing graphic power-saving or undoing graphic power-saving). In addition, the graphic processing unit 433 may adjust a display resolution or a graphic data throughput of an application which is displayed on the display 450 according to a display control signal of the monitoring unit 431. In addition, the resolution management module 611 of the graphic processing unit 433 may identify the graphic adjustment value 513 outputted from the monitoring unit 431, and then adjust the graphic data throughput to a resolution which is lower than the current resolution by 1 level.

The monitoring unit 433 may continue to monitor a change in temperature, battery consumption, or FPS which may degrade the performance of the device over a period of unit time. In addition, the monitoring unit 433 may determine the graphic adjustment value as one or more levels according to the result of continuously monitoring over the period of unit time. When the graphic adjustment value outputted from the monitoring unit 431 (a request to reduce the resolution) is continuously generated, the electronic device may control to reduce the resolution by two or more levels. For example, when the graphic adjustment value (a request to reduce the graphic load) is generated in the second monitoring, the electronic device may perform a control operation to adjust the resolution by 3 levels. In addition, when the graphic adjustment value (a request to reduce the graphic load) is generated in the third monitoring, the electronic device may perform a control operation to adjust the resolution by 2 levels. In addition, when the graphic adjustment value (a request to reduce the graphic load) is generated in the fourth monitoring, the electronic device may perform a control operation to adjust the resolution by 1 level.

As described above, when a power-saving request is detected again within a short time after graphic power-saving/undoing of power-saving is requested, the processor 430 of the electronic device may manage the state of the electronic device by applying a lower resolution to the display 450. When the monitoring unit 431 continuously detects a graphic request, the graphic processing unit 433 may generate a display control signal to apply the resolution higher than the previous resolution by two or more levels.

As described above, the electronic device may monitor heat temperature, battery consumption, a change in FPS, an active state of a background task, and the like, which are factors degrading the performance of the device, and, when it is determined that the factor degrades the performance of the device as a result of monitoring, the electronic device may control a display resolution of an executed application and thus minimize degradation of system performance.

Figure 7:
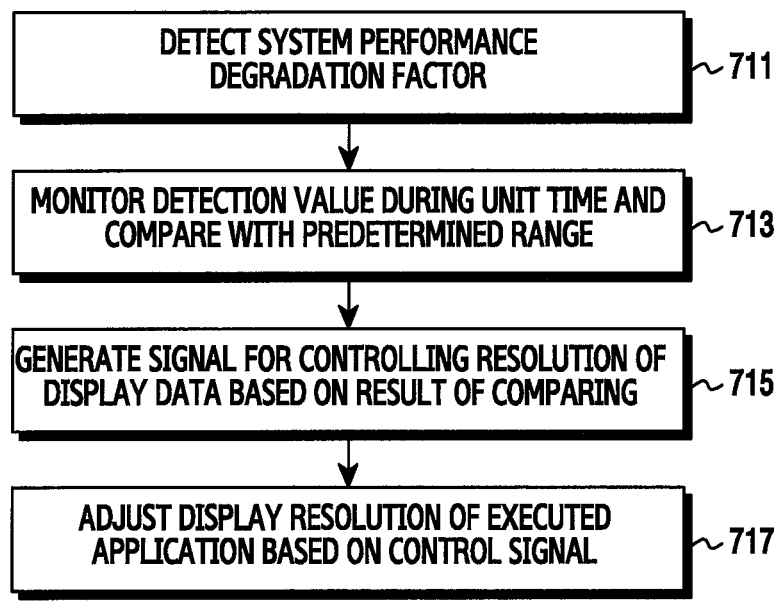
FIG. 7 is a flowchart illustrating a method for controlling a graphic load in the electronic device according to embodiments of the present disclosure.

FIG. 7 is a flowchart illustrating a method for controlling a graphic load in the electronic device according to embodiments. The procedure shown in FIG. 7 may be performed in the processor 430 of the electronic device, and may be an operation which is processed in the monitoring unit 431 and the graphic processing unit 433 of the processor 430.

Referring to FIG. 7, the electronic device may monitor at least one factor which degrades the performance over a set time period (over a unit time period) in operation 711. The factor which degrades the performance may be heat temperature, battery consumption, a change in FPS, or an active state of a background task. In operation 711, the electronic device may detect at least one of the performance degradation factors described above. In addition, the monitoring method may be performed over the unit time period.

Thereafter, in operation 713, the electronic device may monitor the result of detecting during the unit time and compare the result and a set range. The set range may refer to a range in which a condition for shifting to a graphic adjustment mode by the graphic processing unit 433 is set.

In operation 715, when the result value of the monitoring falls out of the set range, the electronic device may generate a signal for controlling a resolution of display data. The electronic device may enter a graphic adjustment mode from a normal graphic processing mode to reduce a graphic load value using the graphic processing unit 433, when the result value of the monitoring falls out of the set range. In addition, the set range may refer to a range for restoring the graphic adjustment mode to the original graphic processing mode. When a result value of monitoring detected in the graphic adjustment mode falls out of the range for maintaining the graphic adjustment mode, the electronic device may restore the graphic load value.

When the resolution control signal is generated, the electronic device may adjust a display resolution of an executed application based on the control signal in operation 717. The electronic device may control the display resolution of the display 450 according to a graphic load value of a set level.

Figure 8:
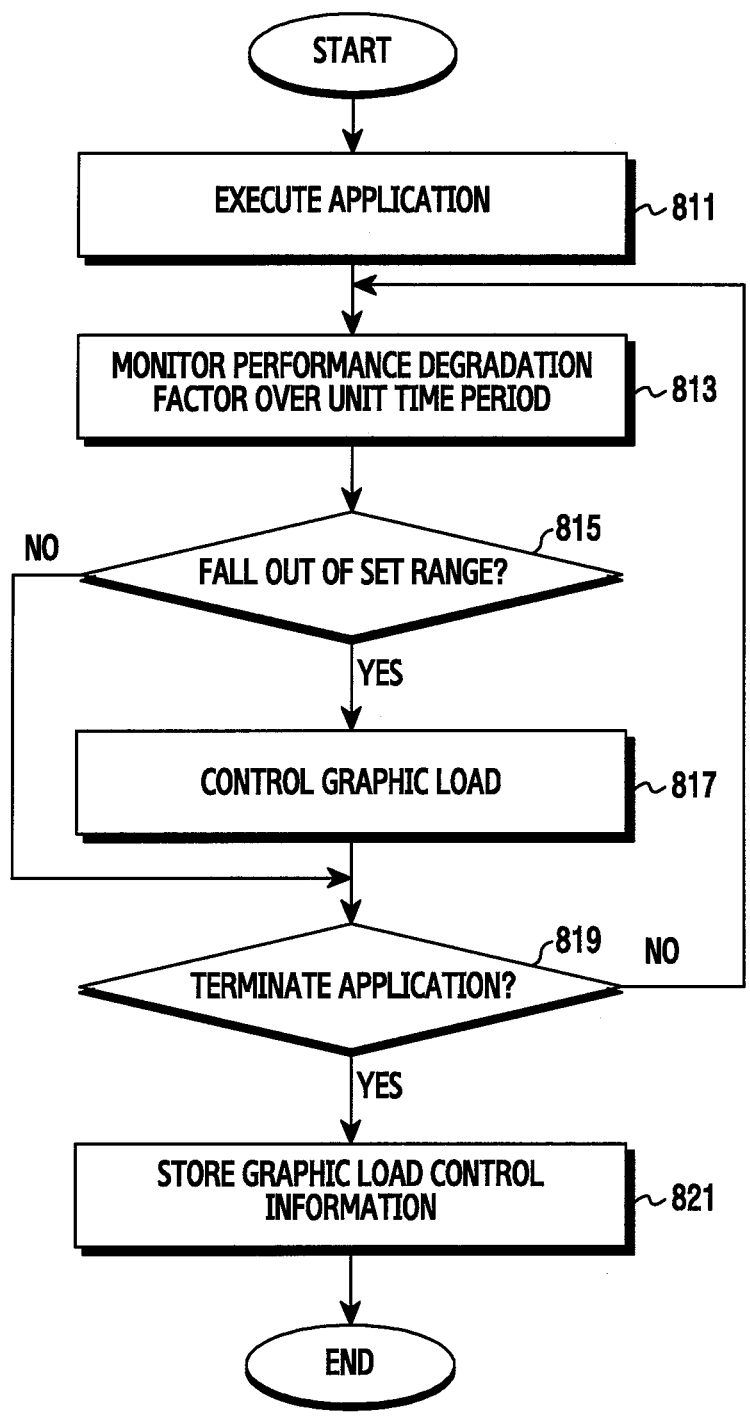
FIG. 8 is a flowchart illustrating a method for controlling a graphic load in the electronic device according to embodiments of the present disclosure.

FIG. 8 is a flowchart illustrating a method for controlling a graphic load in the electronic device according to embodiments. The procedure shown in FIG. 8 may be performed in the processor 430 of the electronic device, and may be an operation which is processed in the monitoring unit 431 and the graphic processing unit 433 of the processor 430.

Referring to FIG. 8, when execution of a certain application is requested, the electronic device may execute the requested application in operation 811. When the application is executed in operation 811, the electronic device may control the display operation of the application according to a graphic adjustment value stored in the memory 470. The application may be an application having a high performance graphic processing function, such as a game, 3D contents, etc. After the application is executed, the electronic device may monitor at least one factor which degrades the performance over a set time period (unit time period) in operation 813. Herein, the factor which degrades the performance may be heat temperature, battery consumption, a change in FPS, or an active state of a background task of the device. The electronic device may monitor at least one of the above-described performance degradation factors in operation 813. The monitoring method may be performed over a period of unit time.

Thereafter, in operation 815, the electronic device may determine whether a result value of the monitoring falls out of a set range or not. The set range may refer to a range in which a condition for shifting to a graphic adjustment mode by the graphic processing unit 433 is set. The graphic processing unit 433 may enter a graphic adjustment mode from a normal graphic processing mode to reduce a graphic load value, when the result value of the monitoring falls out of the set range. In addition, the set range may refer to a range for restoring the graphic adjustment mode to the original graphic processing mode. When a result value of monitoring detected in the graphic adjustment mode falls out of the range for maintaining the graphic adjustment mode, the electronic device may restore the graphic load value. When the graphic adjustment mode is performed, the electronic device may control the display of the display 450 according to a graphic load value of a set level in operation 817. Herein, the control of the graphic load may be a method of controlling a resolution of display data.

When the application is executed, the electronic device may monitor at least one factor which degrades the performance of the device over the set time period, and, when the result of the monitoring falls out of the set range, the electronic device may control the display operation of the application by adjusting a graphic processing operation. This means that, when the performance of the device is degraded, some of the functions of the application are limited to remove the factor which degrades the performance of the device. According to embodiments, when the performance of the device is degraded, the electronic device may reduce the resolution of data displayed on the display 450 and display the application. The operations of monitoring the performance degradation factor over the unit time period and controlling the display function of the application according to the result of the monitoring as described above may be performed repeatedly until the execution of the application is terminated. When the execution of the application is terminated, the electronic device detects this in operation 819 and terminates the execution of the application while storing the graphic load value of the corresponding application in the memory 470 in operation 821.

Figure 9:
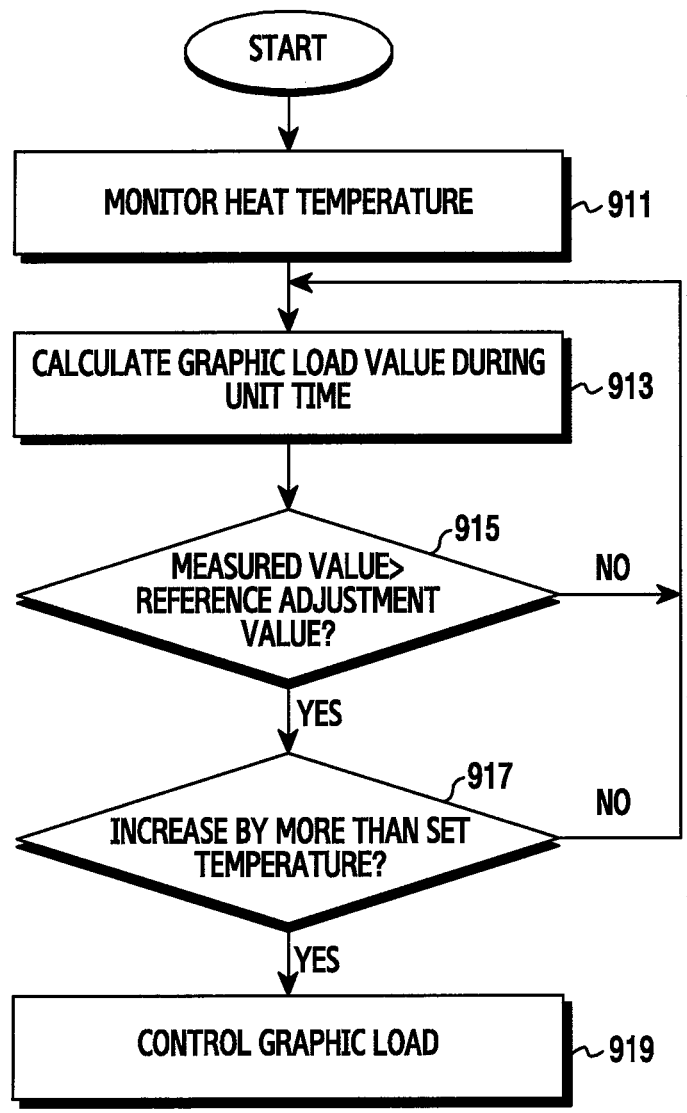
FIG. 9 is a flowchart illustrating a method for monitoring heat temperature of the device and controlling a graphic load in the electronic device according to embodiments of the present disclosure.
Figure 10:
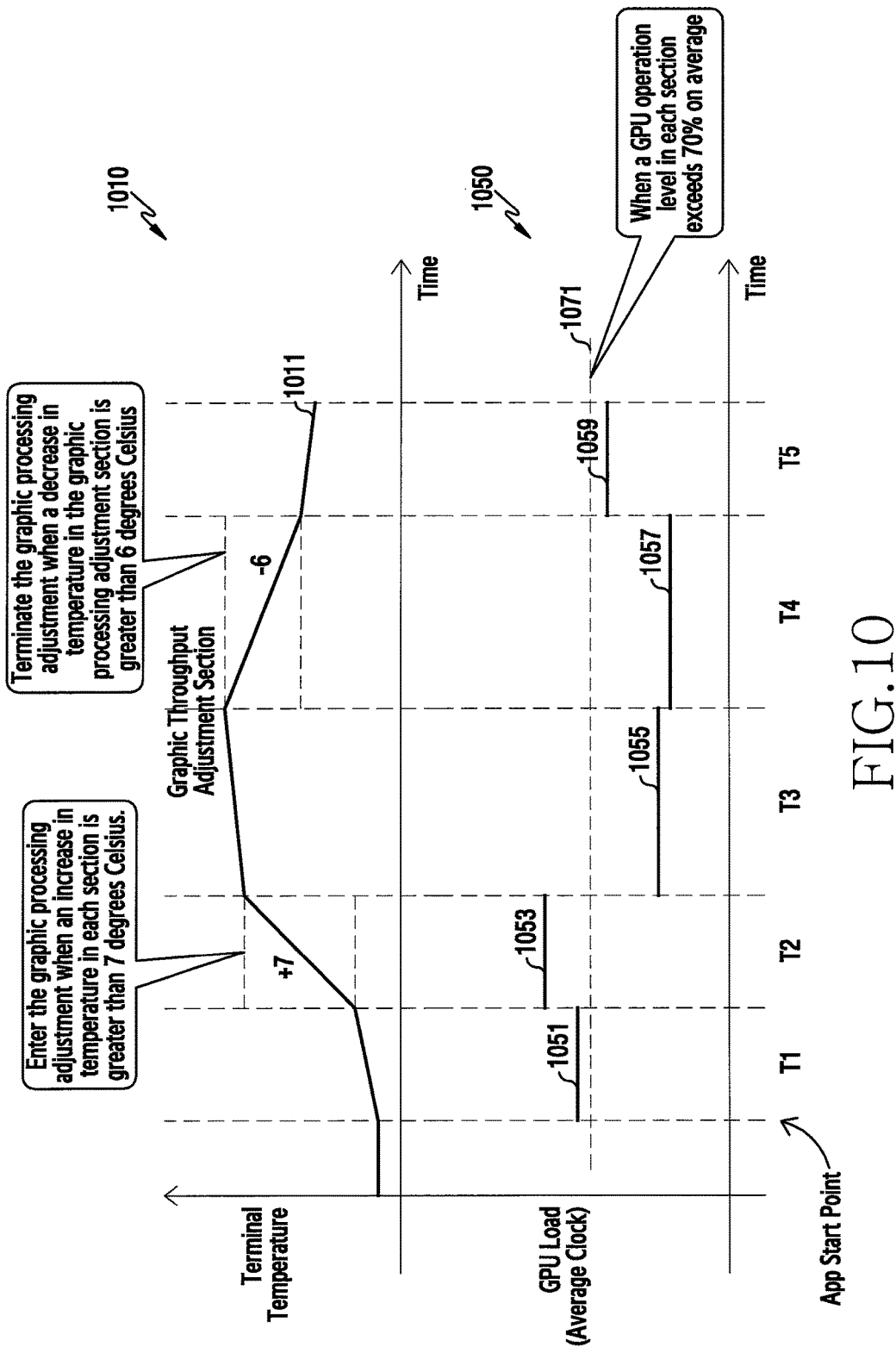
FIG. 10 is a view illustrating a monitoring result, a change in temperature, and a change in a GPU load during a unit time according to an embodiment of the present disclosure.

FIG. 9 is a flowchart illustrating a method for monitoring heat temperature of the device and controlling a graphic load in the electronic device according to embodiments. FIG. 10 is a view illustrating an operation of controlling the graphic load according to the procedure shown in FIG. 9.

Referring to FIG. 9, the electronic device may monitor an output of the temperature sensor of the sensor 410 in operation 911. Herein, the temperature sensor may be mounted on the proximity of a heating part of the device, and detect the heat temperature of the device. The electronic device may monitor a change in the heat temperature during a unit time. In the monitoring operation, the electronic device may calculate a graphic load value processed in the graphic processing unit 433 during the unit time in operation 913. In addition, the electronic device may compare the measured graphic load value and a graphic reference adjustment value in operation 915. In this case, when the measured value is greater than the reference adjustment value, the electronic device may identify this in operation 915 and may determine whether the heat temperature increases by more than set temperature in the corresponding unit time section in operation 917. When it is determined that the heat temperature increases by more than the set temperature in operation 917, the electronic device may control the display operation of the application by changing the graphic load in operation 919. However, when the measured value is less than the reference adjustment value in operation 915 or the heat temperature does not increase by more than the set temperature in operation 917, the electronic device resumes operation 911 to repeat the monitoring operation during the next unit time.

In operation 919, the electronic device may control the graphic load in order to prevent the degradation of the performance which is caused by the heat temperature of the device. The control of the graphic load may be an operation of reducing the display resolution of the executed application. In addition, the adjusted graphic load value may be stored in the memory 470.

In FIG. 9, the method is performed in the order of calculating an average value of the graphic load processed over the unit time period, comparing the calculated average value and the reference adjustment value, and checking the heat temperature. However, the electronic device may check the heat temperature first, and, when the heat temperature increases by more than the set temperature, calculate the average value of the graphic load during the unit time, and then compare the calculated average value and the reference load adjustment value.

FIG. 10 is a view illustrating a result of monitoring, by the monitoring unit of the electronic device, a change in temperature and a change in a GPU load during a unit time according to an embodiment. However, in the graph indicated by reference numeral 1010, which is formed of "time-terminal temperature" axes, the terminal is merely an example of the electronic device and may be changed to other same or similar electronic devices or all kinds of electronic devices with a display.

Referring to FIG. 10, the electronic device may differently set a unit time for the normal graphic processing mode (for example, 2 minutes) and a unit time for the graphic load adjustment mode (for example, 5 minutes) differently. In FIG. 10, unit times T3 and T4 may be unit time sections for the graphic adjustment mode, and the other unit times T1, T2, and T5 may be unit time sections for the normal graphic processing mode. In FIG. 10, reference numeral 1010 indicates a heat temperature characteristic of the device and reference numeral 1011 may indicate a change in the heat temperature of the device. In addition, in FIG. 10, reference numeral 1050 indicates a graph to illustrate a change in the graphic load value processed in the device. In graph 1050 of FIG. 10, reference numerals 1051-1059 may indicate average values of the graphic load which are calculated during the unit times T1-T5, and reference numeral 1071 may indicate a graphic reference adjustment value.

During the unit times T1-T5 shown in FIG. 10, the electronic device may calculate the average values of the graphic load of the graphic processing unit 433, and monitor the heat temperature of the device detected in the temperature sensor of the sensor 410.

It can be seen that, in the unit time section T1, the average value 1051 of the graphic load is higher than the reference adjustment value 1071, but the heat temperature 1011 of the terminal does not increase by more than set temperature (for example, 7° C.). In this case, the electronic device may maintain the current graphic load as it is without adjusting the graphic load.

However, it can be seen that, in the unit time section T2, the average value 1053 of the graphic load is higher than the reference adjustment value 1071 and the heat temperature 1011 of the terminal increases by more than the set temperature (for example, 7° C.). In this case, the electronic device may predict that the performance of the device will be degraded by heat, and prevent the performance degradation of the device by changing the graphic load. That is, when heat is generated higher than set temperature, the electronic device may prevent the performance degradation by reducing the display resolution of the display. In addition, the electronic device may be shifted to the graphic adjustment mode.

The unit time section T3 may be time during which the graphic adjustment mode is performed. In this case, the graphic processing unit 433 may control the display resolution according to an adjusted graphic load value. That is, the electronic device may reduce the display resolution of the application displayed on the display 450, and thus may reduce the entire load of the device. Then, the heat temperature of the device may decrease. In addition, the unit time for the graphic adjustment mode may be set to be longer than the unit time for the normal graphic processing mode.

The unit time section T4 is a section for performing the graphic adjustment mode, and the electronic device may monitor the output of the temperature sensor of the sensor 410. In this case, when the heat temperature 1011 of the device decreases by more than set temperature (for example, 6° C.) in the time section T4, the electronic device may operate to restore to the graphic processing mode of the previous state. That is, when the heat temperature decreases by more than the set temperature in the graphic adjustment mode during the unit time section, the electronic device may control the graphic processing unit 433 to control the display resolution according to the graphic load of the previous state. In addition, when the previous state is the normal graphic processing mode, the electronic device may restore to the normal graphic processing mode in the next unit time section T.

As described above, the monitoring unit 431 of the electronic device may monitor the heat temperature and determine whether the monitored change in the heat temperature is greater than or equal to a specific reference value. In this case, when the heat temperature of the electronic device increases or decreases by more than the specific reference value during a unit time, the electronic device may perform the graphic adjustment mode if the following condition is satisfied:

First, the electronic device may calculate an average value of the graphic load (GPU clocks) during the unit time. For example, the graphic load may range from 0 to 500 MHz. The electronic device may monitor the graphic load values during the unit time and may calculate the average values as indicated by reference numerals 1051-1059 of FIG. 10. Thereafter, the electronic device may compare the average value of the graphic load and a graphic reference adjustment value. Herein, the graphic reference adjustment value may be set to be about 70% of the maximum graphic load of the graphic processing unit 433. Then, the graphic reference adjustment value may be 350 MHz. When the average value of the graphic load is greater than the graphic reference adjustment value (average of graphic load (GPU clock) >graphic reference adjustment value (for example, 350 MHz)) as a result of the comparing, the electronic device may determine whether the temperature increases by more than set temperature (for example, 7° C.) during the unit time. When the temperature increases, the electronic device may control the graphic load of the graphic processing unit 433 to reduce the resolution of the displayed application.

When the temperature decreases by more than set temperature (for example, 6° C.) during the unit time (unit time sections T3 and T4, for example 5 minutes) in the graphic processing adjustment mode, the electronic device may disable the graphic adjustment mode of the current state.

In this case, the unit time and the set temperature for the normal graphic processing mode and the unit time and the set temperature for the graphic adjustment mode may be set differently.

Figure 11:
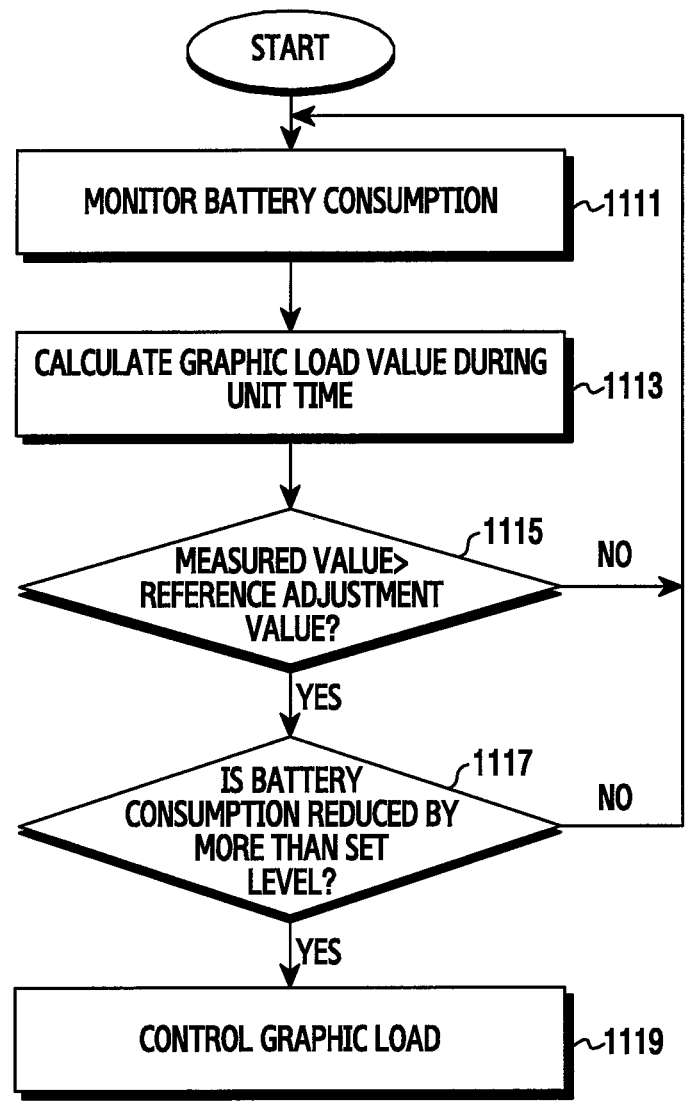
FIG. 11 is a flowchart illustrating a method for monitoring a battery consumption value of the device and controlling a graphic load in the electronic device according to embodiments of the present disclosure.
Figure 12:
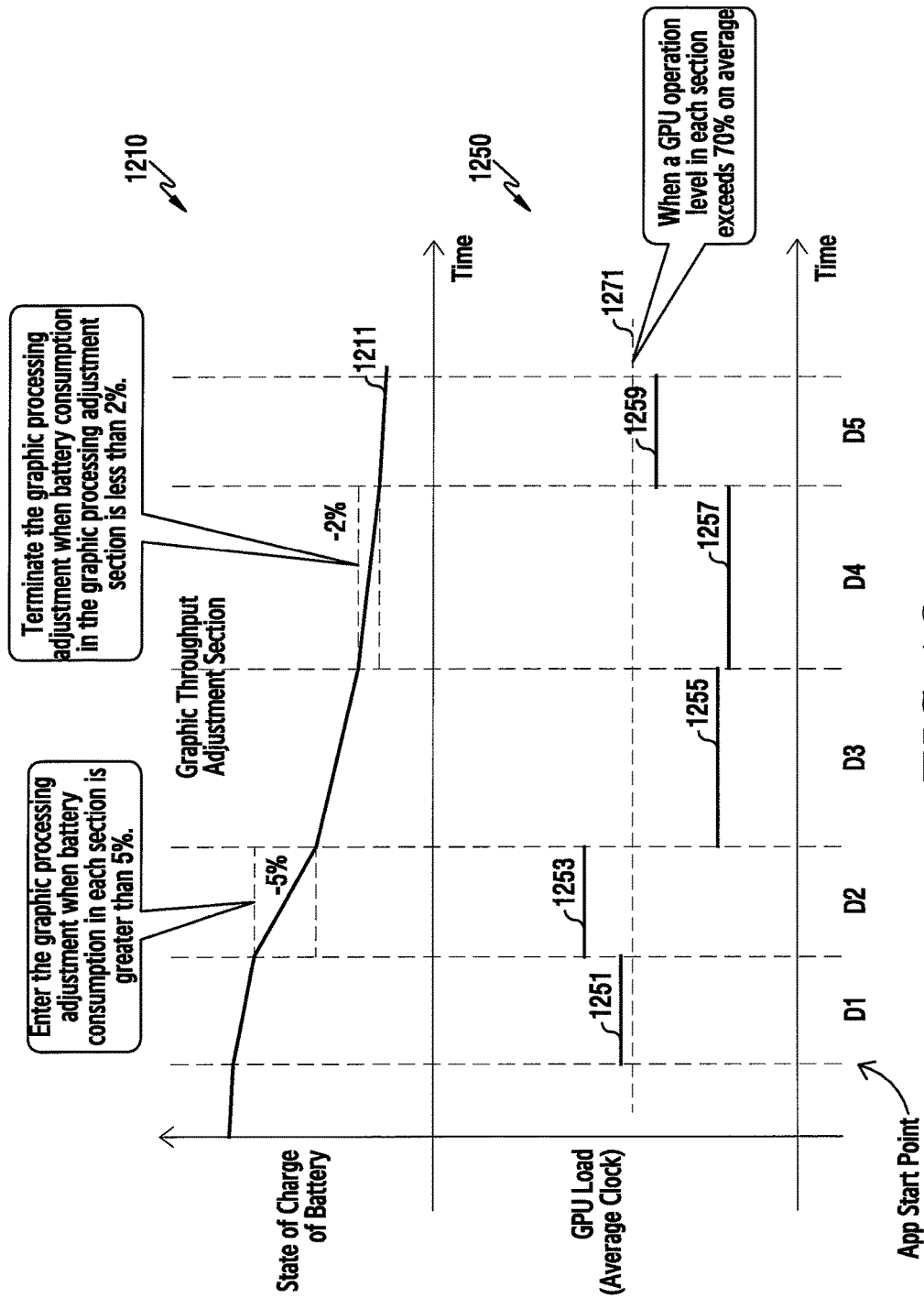
FIG. 12 is a view illustrating a monitoring results, a change in battery consumption, and a change in the GPU load during a unit time according to an embodiment of the present disclosure.

FIG. 11 is a flowchart illustrating a method for monitoring a battery consumption value of the device and controlling a graphic load in the electronic device according to embodiments. FIG. 12 illustrates an operation of controlling the graphic load according to the procedure shown in FIG. 11.

Referring to FIG. 11, the electronic device may monitor an output of a gauge sensor 413 of the sensor 410 in operation 1111. Herein, the gauge sensor may detect a battery consumption value (or a state of charge) of the device. The electronic device may monitor the battery consumption value during a unit time. In the monitoring operation, the electronic device may calculate a value of a graphic load processed in the graphic processing unit 433 during the unit time in operation 1113. In addition, the electronic device may compare the measured value and a graphic reference adjustment value in operation 1115. In this case, when the measured value is greater than the reference adjustment value, the electronic device may identify this in operation 1115 and may determine whether the battery consumption value is changed by more than a set battery consumption value in the corresponding unit time section in operation 1117. Herein, the battery consumption value may be calculated as a percentage. In addition, the battery consumption value may be a decrease rate of the battery which is obtained in each of the sections (for example, a unit time or a period which is N times longer than the unit time).

When the battery consumption value is reduced to be a value which is more than a set level in operation 1117, the electronic device may control the display resolution of the application by changing the graphic load in operation 1119. However, when an average value is less than the reference adjustment value in operation 1115 or the battery consumption value is not increased to be a value which is greater than or equal to a set battery consumption value in operation 1117, the electronic device resumes operation 1111 to repeat the monitoring operation during the next unit time.

In operation 1119, the electronic device may control the graphic load in order to prevent the degradation of the performance which is caused by the battery consumption in the device. The control of the graphic load may be an operation of reducing the display resolution of the executed application. In addition, the adjusted graphic load value may be stored in the memory 470. In FIG. 11, the method is performed in the order of calculating the average value of the graphic load processed over the unit time period, comparing the calculated average value and the reference adjustment value, and then checking the battery consumption value. However, the electronic device may check the battery consumption value firstly, and, when the battery consumption value is increased to a value which is greater than or equal to the set consumption value, calculate the average value of the graphic load during the unit time, and then compare the calculated average value and the reference load adjustment value.

FIG. 12 is a view illustrating a result of monitoring, by the monitoring unit of the electronic device, a change in battery consumption and a change in a GPU load during a unit time according to an embodiment. However, in the graph indicated by reference numeral 1210, which is formed of "time-state of charge of battery" axes, the terminal is merely an example of the electronic device and may be changed to other same or similar electronic devices or all kinds of electronic devices with a display.

Referring to FIG. 12, the electronic device may set a unit time for the normal graphic processing mode (for example, 2 minutes) and a different unit time for the graphic load adjustment mode (for example, 5 minutes). In FIG. 12, unit times D3 and D4 may be unit time sections for the graphic adjustment mode, and the other unit times D1, D2, and D5 may be unit time sections for the normal graphic processing mode. In FIG. 12, reference numeral 1210 indicates a state of charge of a battery of the device, and reference numeral 1211 may indicate battery consumption (or a state of charge). In addition, in FIG. 12, reference numeral 1250 indicates a graph to illustrate a change in the graphic load value processed in the device. In the graph 1250 of FIG. 12, reference numerals 1251-1259 may be average values of the graphic load which are calculated during the unit times D1-D5, and reference numeral 1271 may indicate a graphic reference adjustment value.

During the unit times D1-D5 shown in FIG. 12, the electronic device may calculate the average values of the graphic load of the graphic processing unit 433, and monitor the battery consumption of the device detected in the gauge sensor of the sensor 410.

It can be seen that, in the unit time section D1, the average value 1251 of the graphic load is higher than the reference adjustment value 1271, but the battery of the terminal is not consumed by more than a set consumption value (for example, 5%) as indicated by reference numeral 1211. In this case, the electronic device may maintain the current graphic load as it is without adjusting the graphic load.

However, it can be seen that, in the unit time section D2, the average value 1253 of the graphic load is higher than the reference adjustment value 1271 and the battery of the terminal is consumed by more than the set consumption value (for example, 5%) as indicated by reference numeral 1211. In this case, the electronic device may predict that the performance of the device will be degraded by the battery consumption, and prevent the performance degradation of the device by changing the graphic load. That is, when the graphic load of the graphic processing unit 433 is higher than the reference adjustment value and the battery consumption value is greater than the set battery consumption value, the electronic device may prevent the performance degradation by reducing the display resolution of the display. In addition, the electronic device may be shifted to the graphic adjustment mode.

The unit time section D3 may be time during which the graphic adjustment mode is performed. In this case, the graphic processing unit 433 may control the display resolution according to an adjusted graphic load value. That is, the electronic device may reduce the display resolution of the application displayed on the display 450, and thus may reduce the entire load of the device. Then, the battery consumption of the device may be reduced. In addition, the unit time for the graphic adjustment mode may be set to be longer than the unit time for the normal graphic processing mode.

The unit time section D4 is a section for performing the graphic adjustment mode, and the electronic device may monitor the output of the gauge sensor 413 of the sensor 410. In this case, when the battery consumption value 1211 is less than a set consumption value (for example, 2%) in the section D4, the electronic device may operate to restore to the graphic processing mode of the previous state. That is, when the battery consumption value is less than the set consumption value during the unit time section in the graphic adjustment mode, the electronic device may control the graphic processing unit 433 to control the display resolution according to the graphic load of the previous state. In addition, when the previous state is the normal graphic processing mode, the electronic device may restore to the normal graphic processing mode in the next unit time section D5.

As described above, the monitoring unit 431 of the electronic device may monitor the battery consumption (or state of charge) and determine whether the monitored battery consumption is greater than or equal to a specific reference value. In this case, when the battery consumption is greater than or equal to the specific reference value or less than or equal to another reference during the unit time, the electronic device may perform the graphic adjustment mode if the following condition is satisfied:

First, the electronic device may calculate an average value of the graphic load (GPU clock) during the unit time. For example, the graphic load may range from 0 to 500 MHz. The electronic device may monitor the graphic load value during the unit time and may calculate the average values as indicated by reference numerals 1251-1259 of FIG. 12. Thereafter, the electronic device may compare the average value of the graphic load and a graphic reference adjustment value. Herein, the graphic reference adjustment value may be set to be about 70% of the maximum graphic load of the graphic processing unit 433. Then, the graphic reference adjustment value may be 350 MHz. When the average value of the graphic load is greater than the graphic reference adjustment value (average of graphic load (GPU clock) >graphic reference adjustment value (for example, 350 MHz)) as a result of the comparing, the electronic device may determine whether the battery is consumed by more than a set consumption value (for example, 5%) during the unit time. When the battery is consumed, the electronic device may control the graphic load of the graphic processing unit 433 to reduce the resolution of the displayed application.

When the battery consumption value is less than a set consumption value (for example, 2%) during the unit time (unit time sections D3 and D4, for example, 5 minutes) in the graphic processing adjustment mode, the current graphic adjustment mode may be disabled.

In this case, the unit time and the battery consumption value for the normal graphic processing mode and the unit time and the battery consumption value for the graphic adjustment mode may be set differently.

Figure 13:
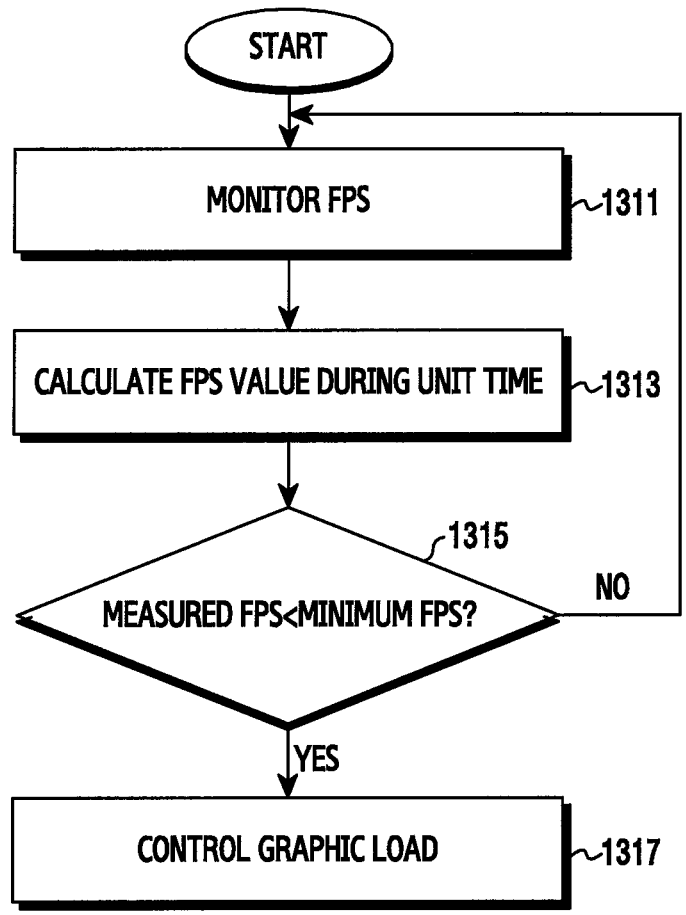
FIG. 13 is a flowchart illustrating a method for monitoring FPS of the device and controlling a graphic load in the electronic device according to embodiments of the present disclosure.
Figure 14A:
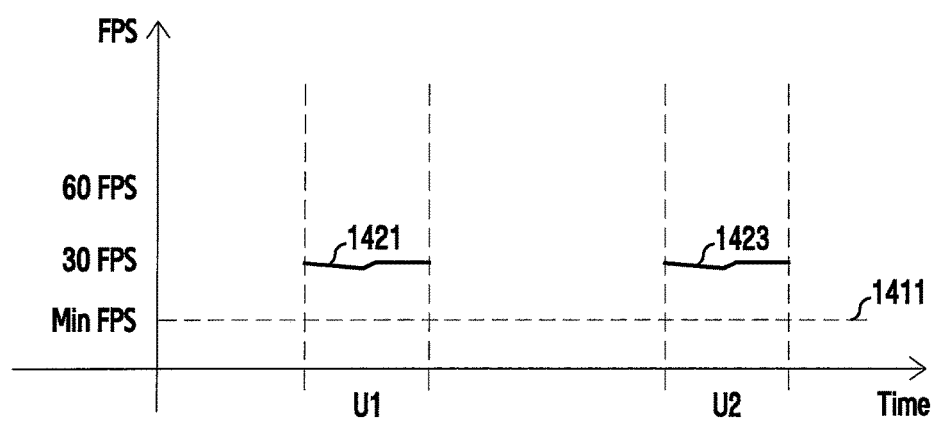
FIGS. 14A and 14B are views illustrating an operation for increasing FPS by adjusting a resolution, when the FPS does not reach a normal level, to drive an application during a unit time according to embodiments of the present disclosure.
Figure 14B:
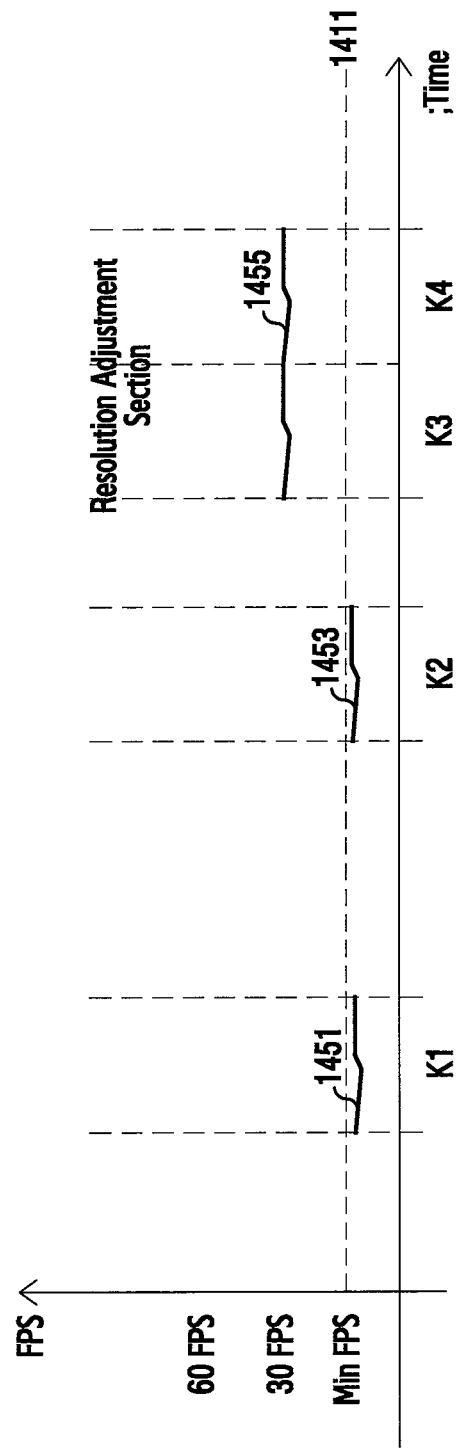

FIG. 13 is a flowchart illustrating a method for monitoring frames per second (FPS) of the device and controlling a graphic load in the electronic device according to embodiments. FIGS. 14A and 14B illustrate views to illustrate an operation of controlling the graphic load according to the procedure of FIG. 13.

Referring to FIG. 13, the electronic device may monitor a change in the FPS in a unit time section in operation 1311. In the monitoring operation, the electronic device may calculate an FPS value processed in the graphic processing unit 433 during the unit time in operation 1313. In addition, the electronic device may check an average value of FPS of an executed application in operation 1315. The method of checking the FPS may use a method of comparing an average of current FPS and set minimum FPS (MIN FPS). The minimum FPS may be set at a level of minimum FPS which does not cause inconvenience to the user, and may vary according to a kind of electronic device and a kind of application. When it is determined that the average FPS is lower than (less than or equal to) the set minimum FPS in operation 1315, the electronic device may control the display operation of the application by changing the graphic load in operation 1317. However, when the average FPS value is higher than the minimum FPS in operation 1315, the electronic device may resume operation 1311 to repeat the monitoring operation during the next unit time.

FIG. 13 illustrates the method of calculating the average FPS and adjusting the graphic load. However, this method may use a similar method to the method of monitoring the heat temperature and the battery consumption and controlling the graphic load. First, the electronic device may use a method of calculating an average graphic load value during a unit time of the graphic processing unit 433, and comparing the calculated average graphic load value and a reference adjustment value. Then, when the average graphic load value is higher than the reference adjustment value and the average FPS is less than the minimum FPS, the electronic device may adjust the graphic load. Second, the electronic device may adjust the graphic load according to a current graphic load value and current FPS. The electronic device may calculate the average of the graphic load processed during the unit time period, and, when the calculated average is greater than or equal to a set graphic load (for example, a maximum value of the graphic load (for example, 500 MHz) or a set graphic load (a value approaching the maximum value of the graphic load (for example, 400 MHz)), and the current FPS is less than the minimum FPS, the electronic device may adjust the graphic load. When the current FPS is lower than the minimum FPS, the electronic device may control the graphic load in operation 1317 to prevent the performance degradation of the device. The control of the graphic load may be an operation of reducing the display resolution of the executed application. In addition, the adjusted graphic load value may be stored in the memory 470.

The current FPS being lower than the minimum FPS may mean that display data may suffer from interruptions or may be displayed at abnormal speed. According to embodiments, when the FPS is lower than the minimum FPS, the electronic device may adjust the FPS to increase by reducing the resolution of the display data of the application. Accordingly, the resolution of the screen may be degraded, but the electronic device may display the application with the normal FPS by minimizing the performance degradation of the device.

FIG. 14A is a view illustrating an operation of processing FPS with a normal graphic load in the graphic processing unit of the electronic device according to embodiments.

Referring to FIG. 14A, reference numeral 1421 indicate average FPS during unit time U1, and reference numeral 1423 indicates average FPS during unit time U2. In addition, reference numeral 1411 indicates minimum FPS. Herein, the minimum FPS may be set at a level of minimum FPS (for example, about 20 FPS) which does not cause inconvenience to the user when an application is driven. The minimum FPS may vary according to a kind of electronic device, application, or user. In addition, the minimum FPS may be changed according to user's setting or automatically.

It can be seen from FIG. 14A that the average FPS during the unit time U1 is 30 FPS and is higher than the minimum FPS. In addition, it can be seen that the average FPS during the unit time U2 is 30 FPS and is higher than the minimum FPS. In this case, it is determined that there is no problem in the usability of the function which is being currently performed, and thus the resolution may be maintained as it is. Accordingly, the electronic device may not enter the graphic adjustment mode.

In response to another condition (for example, execution of another application, an active state of a background application, etc.) occurring, the electronic device may not maintain the FPS of the currently executed application. In particular, when an application processing high-resolution display data is processed, the average graphic load of the electronic device increases and eventually the graphic load may reach a maximum value. To this end, the FPS of the application may be reduced to be lower than the minimum FPS, causing a great inconvenience to the user when the user uses the electronic device. Therefore, when the FPS is lower than the set minimum FPS, the electronic device may increase the FPS by reducing the resolution, so that user's convenience can be solved.

FIG. 14B is a view illustrating an operation of, when FPS does not reach a normal level to drive an application during a unit time, increasing the FPS by adjusting a resolution according to an embodiment. For example, it may be assumed that, when an application is driven in a high-resolution electronic device, a graphic load average value is very high and thus FPS is low. The monitoring unit 431 may detect an FPS level and analyze average FPS during a unit time. When the average FPS level does not reach the minimum FPS level during the unit time, the electronic device may enter the graphic adjustment mode.

In FIG. 14B, reference numerals 1451,1453, and 1455 indicate average FPS values in unit times K1, K2, and K3-K4, respectively. In addition, reference numeral 1411 refers to the above-mentioned minimum FPS. As can be seen from FIG. 14B, the average FPS value 1451 during the unit time K1 does not reach the minimum FPS value. This situation may frequently occur in a high-resolution device. In this case, the average of the graphic load may be close to the maximum value. Accordingly, the electronic device may enter a first graphic adjustment mode. In the graphic adjustment mode, the graphic load may be adjusted based on a graphic adjustment value of the monitoring unit.

It may be assumed that the resolution of the display 450 may be reduced by one level through the first graphic adjustment procedure. As a result of analyzing the average FPS during the unit time K2 of the monitoring unit, the average FPS value 1453 slightly increases in comparison with the average FPS value 1451, but still does not reach the minimum FPS level. In this case, the average graphic load may be still high due to the high resolution. Accordingly, the electronic device may enter a second graphic adjustment mode. Based on the graphic adjustment value of the monitoring unit, the graphic processing unit 433 may reduce the resolution of the display 450 by one or more levels.

It can be seen that the average FPS value 1455 during the unit times 3 and 4 exceeds the minimum FPS through the second graphic adjustment procedure.

Through the above-described procedure, the average FPS value greater than or equal to the minimum FPS level can be ensured in the electronic device.

Figure 15:
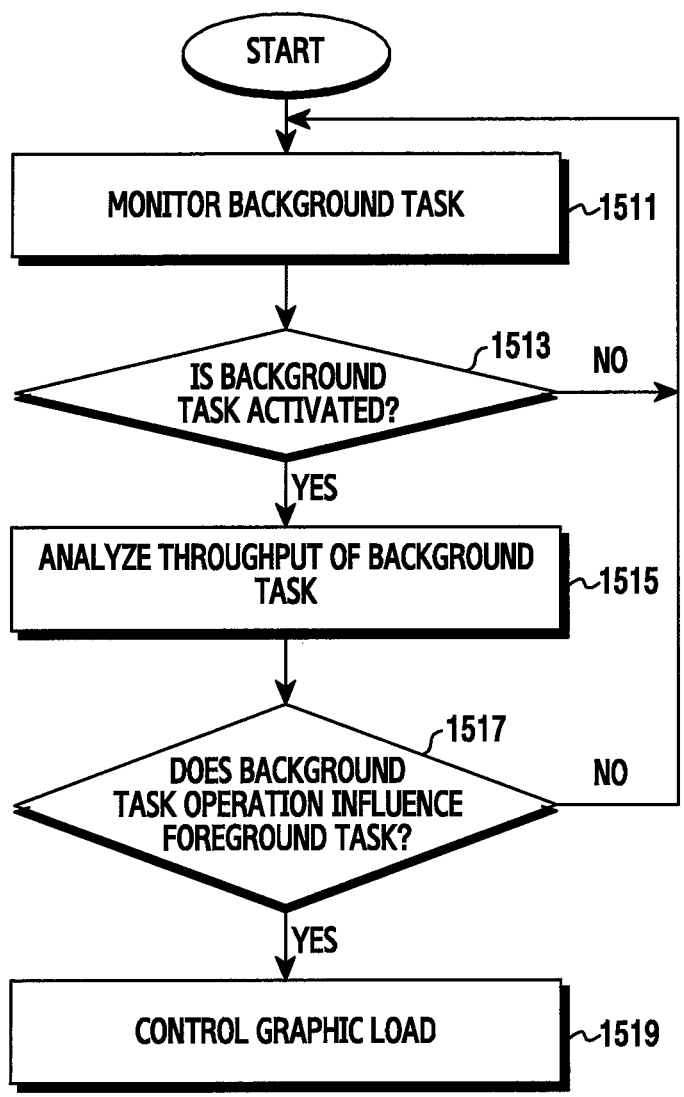
FIG. 15 is a flowchart illustrating a method for monitoring an active state of a background application (or task) and controlling a graphic load in the electronic device according to embodiments of the present disclosure.
Figure 16:
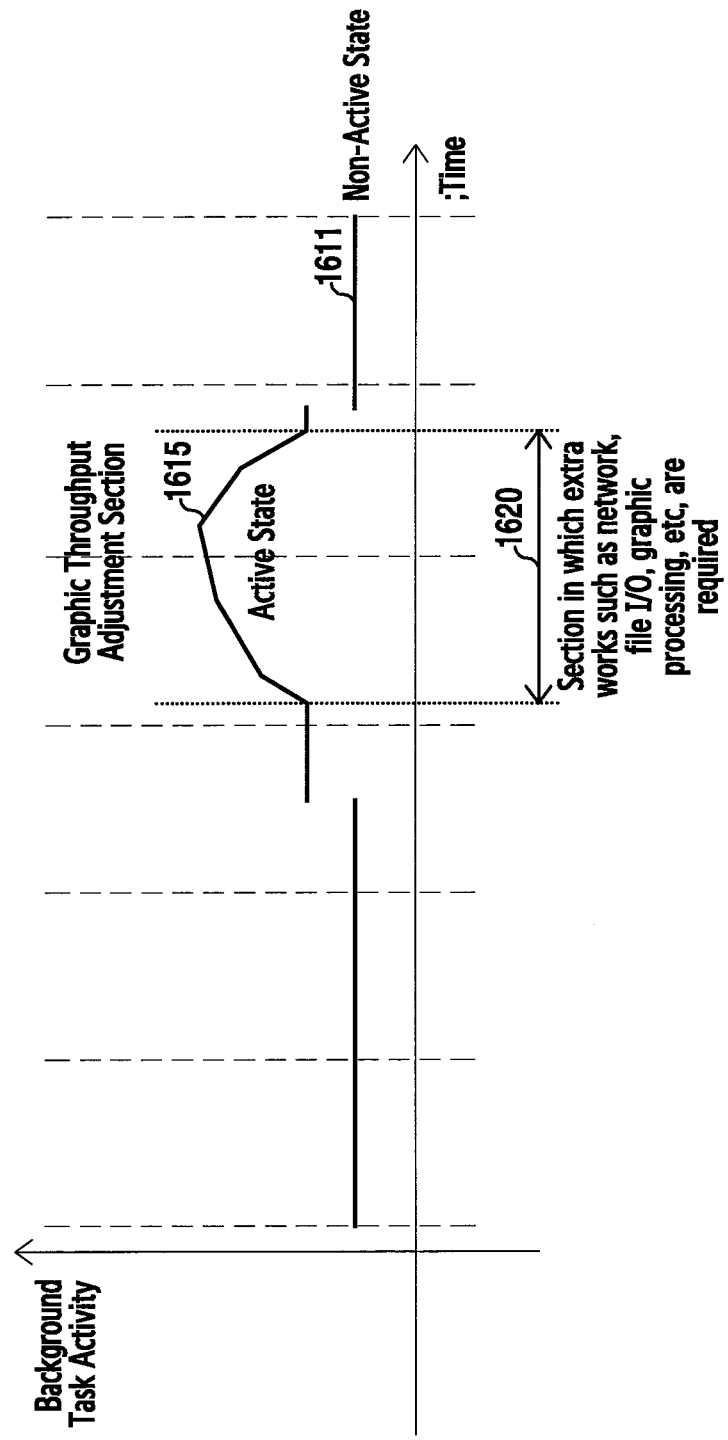
FIG. 16 is a view illustrating a monitoring result and a change in the operation of the background application (or task) according to an embodiment of the present disclosure.

FIG. 15 is a flowchart illustrating a method for monitoring an active state of a background application (task) and controlling a graphic load in the electronic device according to embodiments. FIG. 16 illustrates a view to illustrate an operation of controlling the graphic load according to the procedure of FIG. 15.

Referring to FIG. 15, the monitoring unit 431 of the electronic device may monitor the background task in operation 1511. In the monitoring operation, the electronic device may monitor whether the background task is activated or not in operation 1513. When the background task is in a non-active state as a result of the monitoring, the electronic device may resume operation 1511 to monitor whether the background task is activated or not again. When the background task is in the active state, the electronic device may analyze a throughput (or activity) of the background task in operation 1515. The electronic device may determine whether the amount of load of the device increases or not by analyzing the throughput. In addition, in operation 1517, the electronic device may determine whether the active state of the background task influences a foreground task or not. The influence may include one or more of an increase in temperature, an increase in battery consumption, and a decrease in FPS. When the active state of the background task does not influence the foreground task, the electronic device does not enter the graphic load adjustment mode and resumes operation 1511 to monitor the background task again. When the active state of the background task influences the foreground task, the electronic device may control the graphic load to prevent performance degradation which is caused by the active state of the background task. The control of the graphic load may be an operation of reducing the display resolution of the executed application. In addition, the adjusted graphic load value may be stored in the memory 470.

FIG. 16 is a view illustrating a result of monitoring, by the monitoring unit of the electronic device, a change in the operation of a background application (or task) according to an embodiment. In FIG. 16, reference numeral 1611 may indicate activity (or throughput) in the non-active state of the background application, and reference numeral 1615 may indicate activity (or throughput) in the active state. In addition, reference numeral 1620 may indicate a graphic throughput adjustment section of the device.

The monitoring unit 431 of the electronic device may monitor an active state of a background application in each unit time section. The monitoring unit 431 may monitor an activating time of the background application (time at which the background application is shifted to the active state) and an ending time of the background application (time at which the background application is shifted to a suspend state).

The monitoring unit 431 may monitor whether the active state of the background application causes a factor which degrades the performance of the device in the section 1620. The factor may include one or more of an increase in temperature of the device, an increase in battery consumption, or a decrease in FPS.

The section 1620 may be a section in which the background application is activated, and it is illustrated that the activity of the background task increases in the activation section as indicated by reference numeral 1615. When the factor causing the performance degradation of the device is generated due to the active state of the background task as in the section 1620, the device may enter the graphic throughput adjustment mode. As indicated by reference numeral 1615, the activity of the background application increases on average in the section 1620 and thus the factor causing the performance degradation of the device may be generated. In this case, the device may adjust the graphic throughput by adjusting the resolution. That is, at the time when the background application is activated, the electronic device may reduce the display resolution. In addition, when the background application is shifted to the suspend state, the electronic device may adjust to restore the resolution. Referring FIG. 16, the device may adjust the graphic throughput by reducing the resolution by one or more levels at a time of the section 1620, and may adjust the graphic throughput by restoring the resolution at the ending time of the section 1620.

In addition, the device may store a type of a background application which generates the performance degradation factor, and an activating period thereof in the memory. To this end, when it is time to activate the background application, the device may enter the graphic throughput adjustment mode without determining whether the performance degradation factor is generated or not.

Figure 17:
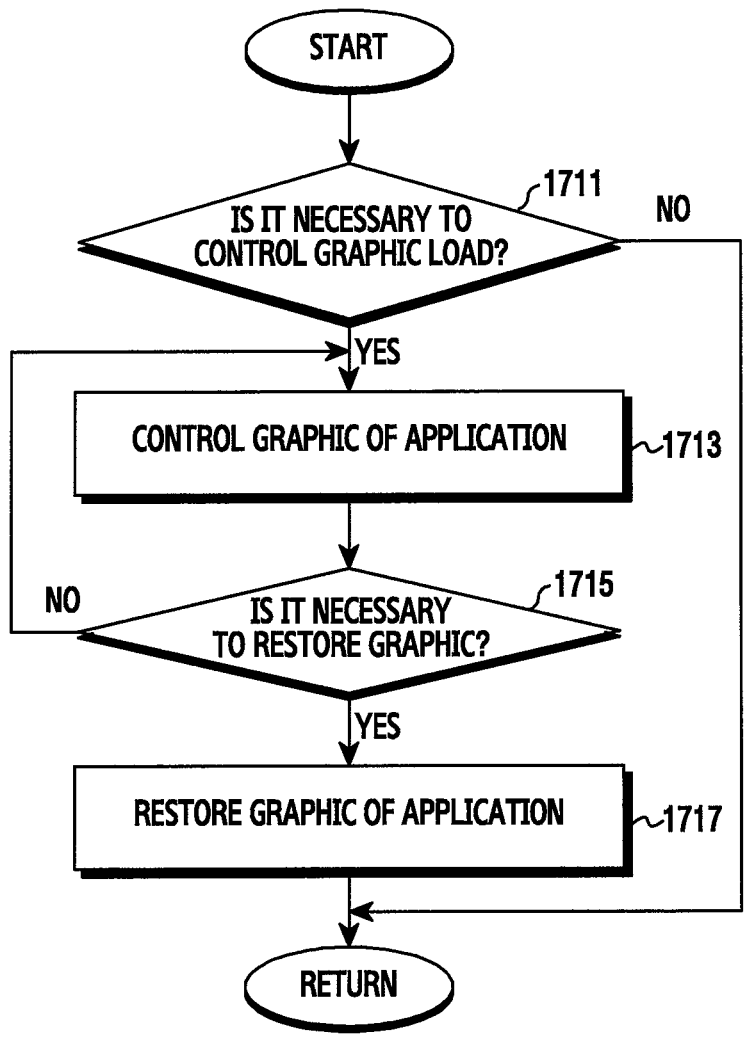
FIG. 17 is a flowchart illustrating a method for controlling a graphic load in the electronic device according to embodiments of the present disclosure.
Figure 18A:
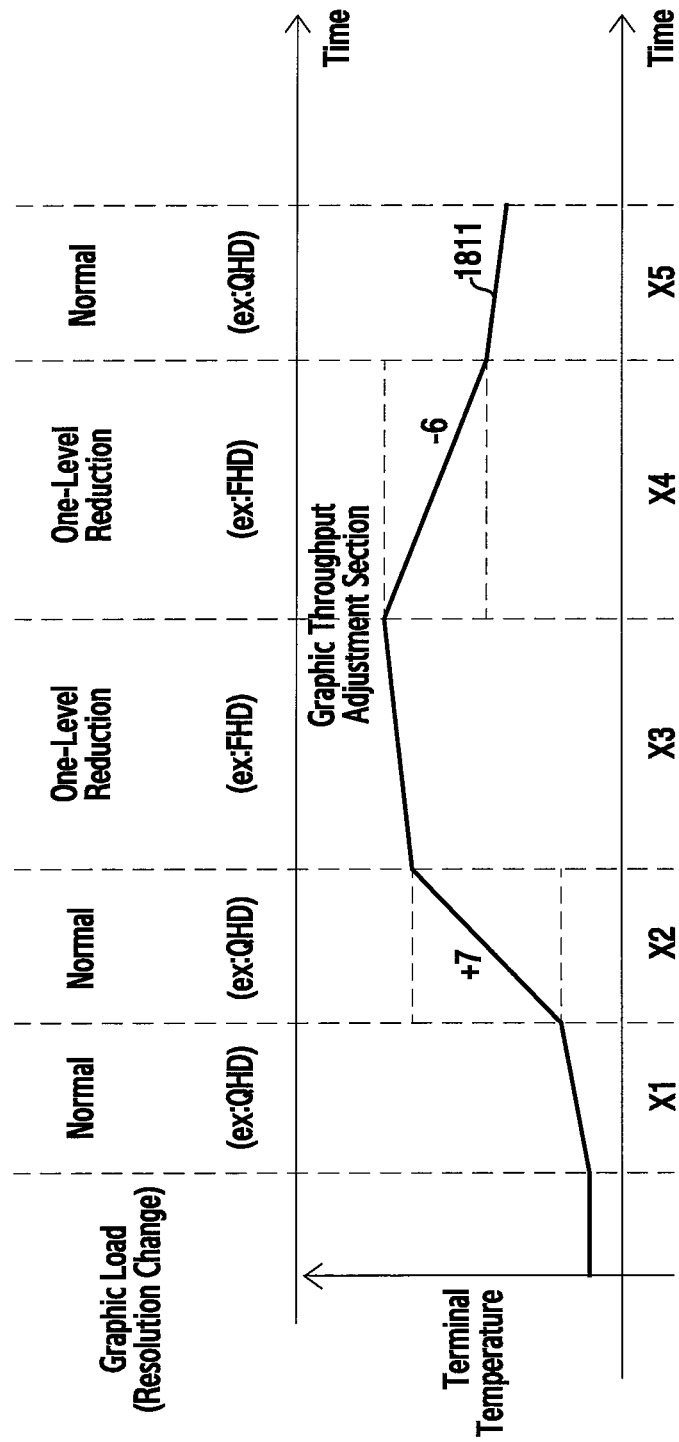
FIGS. 18A and 18B are views illustrating monitoring results, a change in temperature, and a change in a resolution during a unit time according to an embodiment of the present disclosure.
Figure 18B:
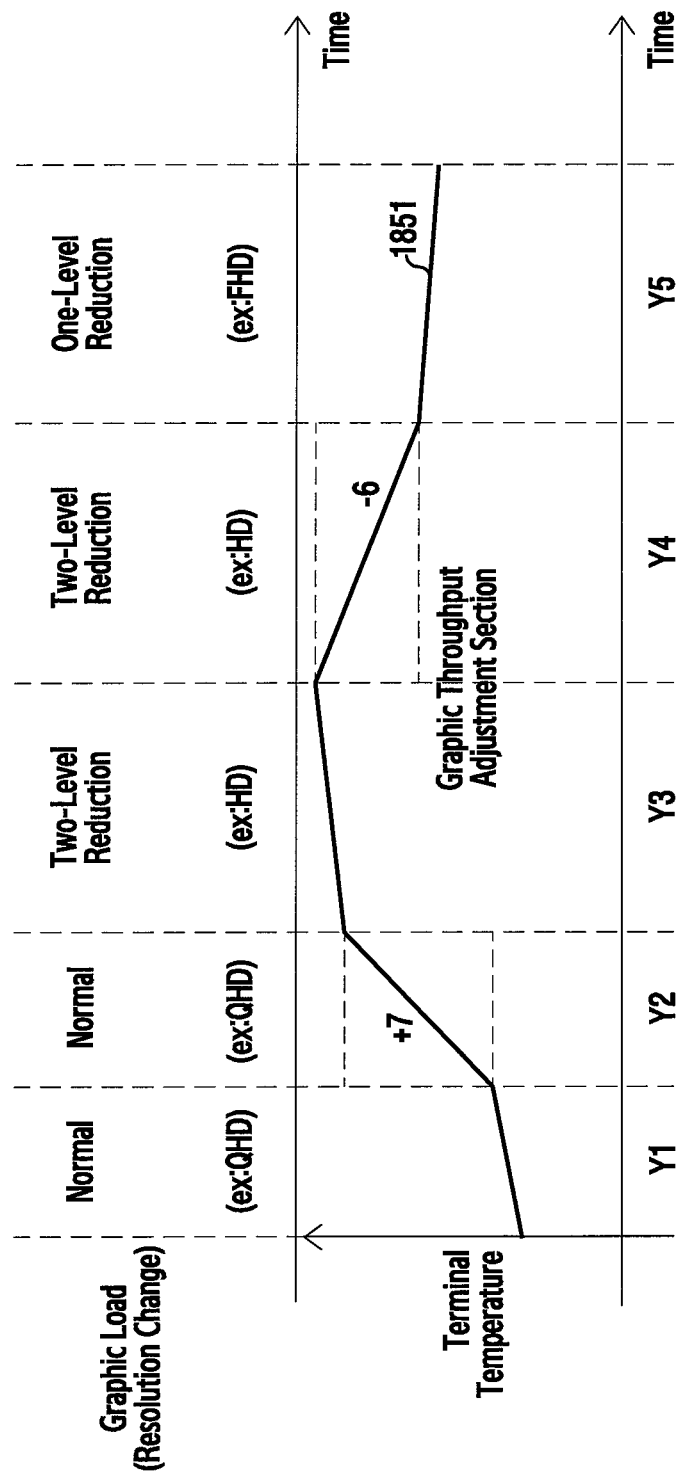

FIG. 17 is a flowchart illustrating a method of controlling a graphic load in the electronic device according to embodiments. FIGS. 18A and 18B illustrate views to illustrate an operation of controlling the graphic load according to the procedure of FIG. 17.

Referring to FIG. 17, the electronic device may determine whether it is necessary to control a graphic load in operation 1711. It is determined that the graphic load should be controlled when at least one performance degradation factor of an increase in temperature of the device, an increase in battery consumption, a decrease in FPS, or an active state of a background task is caused and thus a display control signal is generated. Herein, the display control signal may be a control signal for controlling the graphic load of the graphic processing unit in response to the performance degradation factor being caused. In addition, the graphic processing unit 433 may control the resolution of displayed data when adjusting the graphic load. Accordingly, when it is not necessary to control the graphic load, the electronic device may not enter the graphic adjustment mode. In this case, the graphic load of the electronic device, that is, the resolution of the display 450 may be maintained.

When it is determined that it is necessary to control the graphic load of the device in operation 1711, the electronic device may control the graphic load of the application in operation 1713. The resolution for controlling the graphic load may have levels such as QHD, FHD, HD, qHD as shown in FIG. 6. The control of the graphic load may include a method of reducing the resolution of the display 450 by one level (for example, from QHD to FHD) or by two levels (for example, from QHD to HD) according to a result value of the monitoring. When the control of the graphic load is achieved, the electronic device may perform a graphic adjustment mode. The electronic device may determine whether to restore the graphic load in the graphic adjustment mode. The graphic load may be restored when the factor causing the performance degradation is solved. It is determined whether the graphic load is restored or not based on the state of the device resulting from the graphic control, for example, battery consumption, a change in FPS, etc. When a condition for restoring the graphic load is not satisfied, the electronic device may detect this in operation 1715 and resume operation 1713 to perform the graphic adjustment mode of the application. When it is determined that the condition for restoring the graphic load is satisfied, the electronic device may detect this in operation 1715 and restore the graphic load of the application in operation 1717. The restoration of the graphic load may include a method of increasing the resolution of the displayed data by one or more levels.

FIG. 18A is a view illustrating a result of monitoring, by the monitoring unit of the electronic device, a change in temperature and a change in a resolution during a unit time according to an embodiment. However, in the graph of FIG. 18A, which is formed of "time-terminal temperature" axes, the terminal is merely an example of the electronic device and may be changed to other same or similar electronic devices or all kinds of electronic devices with a display. In FIGS. 18A and 18B, heat temperature is regarded as the performance degradation factor, for example.

Referring to FIG. 18A, the electronic device may differently set a unit time (for example, 2 minutes) for the normal graphic processing mode and a unit time (for example, 5 minutes) for the graphic load adjustment mode. In FIG. 18A, unit times X3 and X4 may be time unit sections for the graphic adjustment mode, and the other unit times X1, X2, and X5 may be unit time sections for the normal graphic processing mode. In FIG. 18A, reference numeral 1811 indicates a heat temperature characteristic of the device.

In FIG. 18A, the electronic device may monitor heat temperature of the device and a resolution of the display 450 during the unit times X1-X5. It can be seen that heat temperature 1811 of the terminal in the unit time section X1 does not increase by more than set temperature (for example, 7° C.). In this case, the electronic device may maintain the current graphic load as it is without adjusting the graphic load. That is, as shown in FIG. 18A, the normal resolution (for example, QHD) may be maintained in the section X1.

However, it can be seen that the heat temperature 1811 of the terminal in the unit time section X2 increases by more than the set temperature (for example, 7° C.). In addition, when it is assumed that an average value of the graphic load is higher than the graphic reference adjustment value, the electronic device may predict that the performance of the device will be degraded by the heat, and may prevent the performance degradation by changing the graphic load. That is, when the heat is generated higher than the set temperature, the electronic device can prevent the performance degradation by reducing the display resolution of the display. In addition, the electronic device may be shifted to the graphic adjustment mode. However, since the electronic device is not still shifted to the adjustment mode in the section X2 as shown in FIG. 18A, the normal resolution is maintained.

The unit time section X3 may be time during which the graphic adjustment mode is performed. In this case, the graphic processing unit 433 may control the display resolution according to an adjusted graphic load value. That is, the electronic device may reduce the display resolution of the application displayed on the display 450 and thus may reduce the entire load of the device. As shown in FIG. 18A, the display resolution of the application may be in an one-level reduction state (for example, the resolution is reduced from QHD to FHD). Accordingly, the heat temperature of the electronic device may decrease. In addition, the unit time for the graphic adjustment mode may be set to be longer than the unit time for the graphic processing mode.

The section X4 is a section in which the graphic adjustment mode is performed, and the electronic device may monitor an output of the temperature sensor of the sensor 410. The electronic device may operate to restore to the graphic processing mode of the previous state when the heat temperature 1811 of the device is reduced by more than set temperature (for example, 6° C.). That is, when the heat temperature is reduced by more than the set temperature during the unit time in the graphic adjustment mode, the electronic device may control the graphic processing unit 433 to control the display resolution according to the graphic load of the previous state. In addition, when the previous state is the normal graphic processing mode, the electronic device may restore to the normal graphic processing mode in the next unit time section. That is, the resolution of the display 450 of the electronic device in the section X5 may be the normal resolution as shown in FIG. 18A.

FIG. 18B is a view illustrating a change in temperature and a change in a resolution during a unit time in the electronic device according to an embodiment. FIG. 18B differs from FIG. 18A in that it is assumed that the temperature of the terminal in section Y1 is high in comparison with the temperature in the section X1 of FIG. 18A. However, in the graph of FIG. 18B which is formed of "time-terminal temperature" axes, the terminal is merely an example of the electronic device and may be changed to other same or similar electronic devices or all kinds of electronic devices with a display.

Referring to FIG. 18B, the electronic device may differently set a unit time (for example, 2 minutes) for the normal graphic processing mode and a unit time (for example, 5 minutes) for the graphic load adjustment mode. In FIG. 18B, unit times Y3, Y4, and Y5 may be unit time sections for the graphic adjustment mode, and the other unit times Y1 and Y2 may be unit time sections for the normal graphic processing mode. In FIG. 18B, reference numeral 1851 indicates a heat temperature characteristic of the device.

In FIG. 18B, the electronic device may monitor heat temperature of the device, which is detected by the temperature sensor of the sensor 410, and monitor a graphic load value, which is processed by the graphic processing unit 433 during the unit times Y1-Y5.

It can be seen that heat temperature 1851 of the terminal in the unit time section Y1 does not increase by more than set temperature (for example, 7° C.). In this case, the electronic device may maintain the current graphic load as it is without adjusting the graphic load. That is, as shown in FIG. 18B, the normal resolution may be maintained in the section Y1.

However, it can be seen that the heat temperature 1851 of the terminal in the unit time section Y2 increases by more than the set temperature (for example, 7° C.). In addition, when it is assumed that an average value of the graphic load is higher than the graphic reference adjustment value, the electronic device may predict that the performance of the device will be degraded by the heat, and may prevent the performance degradation of the device by changing the graphic load. That is, when the heat is generated higher than the set temperature, the electronic device can prevent the performance degradation by reducing the display resolution of the display. In this case, when a result value of the monitoring of the performance degradation factor of the device (for example, heat temperature) is detected as being high, and the graphic load value is close to a maximum value or is greater than a set value, if the resolution is controlled through normal graphic load adjustment (for example, by reducing the graphic load by one level), the performance of the device may be restored slowly. In this case, the electronic device may adjust the graphic load by a larger value (for example, by reducing the graphic load by two levels). In addition, the electronic device may be shifted to the graphic adjustment mode.

The unit time section Y3 may be time during which the graphic adjustment mode is performed. In this case, the graphic processing unit 433 may control the display resolution according to an adjusted graphic load value. That is, the electronic device may reduce the display resolution of the application displayed on the display 450 by one or more levels, and thus may reduce the entire load of the device. As shown in FIG. 18B, the display resolution of the application may be in a two-level reduction state (for example, the resolution is reduced from QHD to HD). This is to solve the heat problem rapidly by reducing the resolution by two levels since the temperature of the terminal is higher than in FIG. 18A. Then, the heat temperature of the device may rapidly decrease. In addition, the unit time for the graphic adjustment mode may be set to be longer than the unit time for the graphic processing mode.

The section Y4 is a section in which the graphic adjustment mode is performed, and the electronic device may monitor an output of the temperature sensor of the sensor 410. When the heat temperature 1851 of the device is reduced by more than set temperature (for example, 6° C.) in the section Y4, the electronic device may operate to restore to the graphic processing mode of the previous state or of a state higher than the previous state by one level. That is, when the heat temperature is reduced by more than the set temperature during the unit time in the graphic adjustment mode, the electronic device may control the graphic processing unit 433 to control the display resolution according to the graphic load of the previous state or of a state higher than the previous state by one level. In addition, when the previous state is the two-level reduction state, the electronic device may restore to the one-level reduction state of the resolution or the normal resolution state in the next unit time Y5. That is, the resolution of the display 450 of the electronic device in the section Y5 may be the one-level reduction state (for example, FHD) as shown in FIG. 18B.

Figure 19:
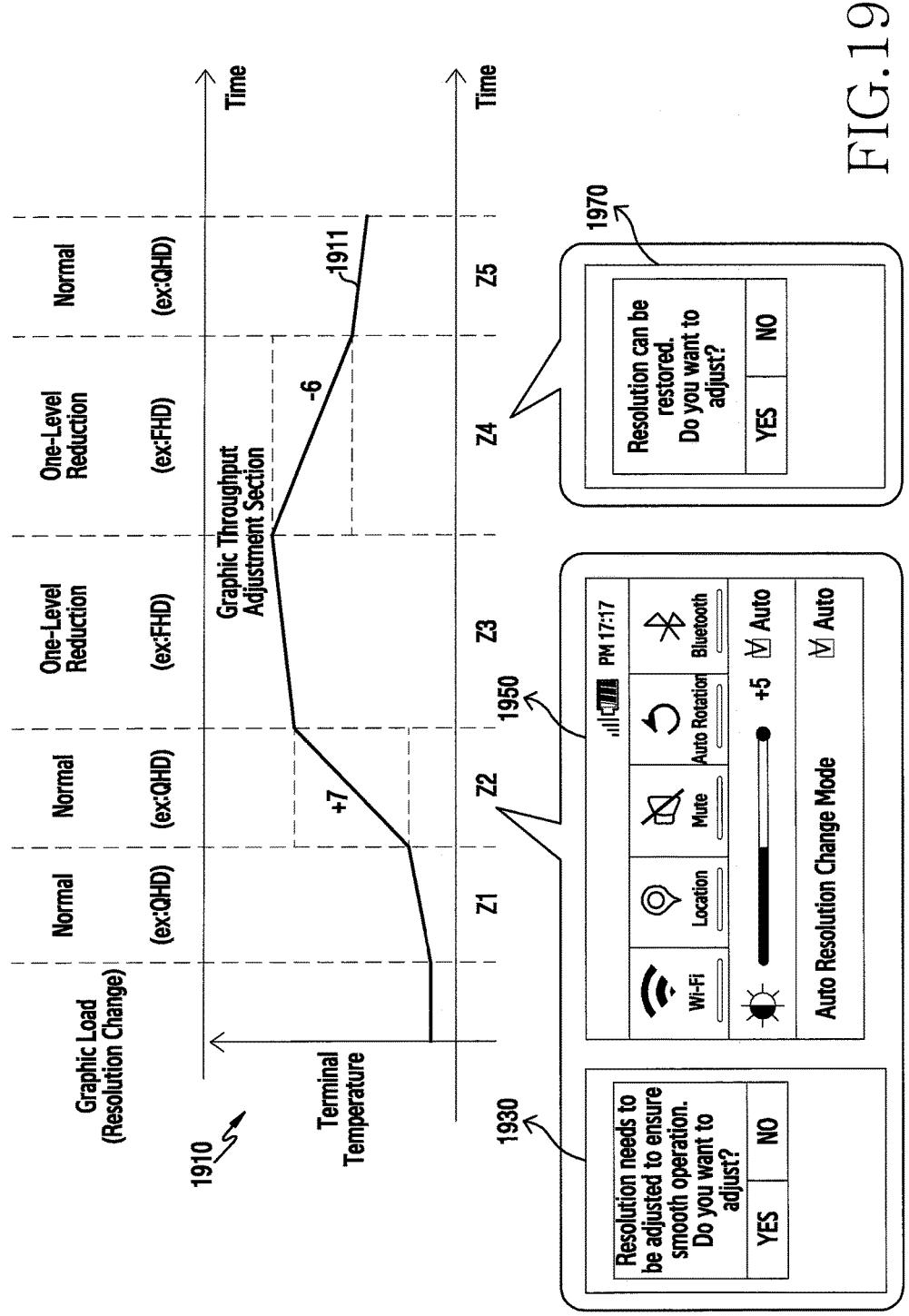
FIG. 19 is a view illustrating an operation of receiving a user's selection regarding a change of resolution during a graphic power saving operation according to an embodiment of the present disclosure.

FIG. 19 is a view illustrating an operation of receiving selection of a user regarding a change in the resolution when a graphic power saving operation is requested according to an embodiment. However, in the graph indicated by reference numeral 1910, which is formed of "time-terminal temperature" axes, the terminal is merely an example of the electronic device and may be changed to other same or similar electronic devices or all kinds of electronic devices with a display. The display 450 of the device may include a touch type input module.

Referring to FIG. 19, the electronic device may differently set a unit time (for example, 2 minutes) for the normal graphic processing mode and a unit time (for example, 5 minutes) for the graphic adjustment mode. In FIG. 19, unit times Z3 and Z4 may be unit time sections for the graphic adjustment mode, and the other unit times Z1, Z2, and Z5 may be unit time sections for the normal graphic processing mode. In FIG. 19, reference numeral 1911 indicates a heat temperature characteristic of the device.

The electronic device may monitor heat temperature of the device detected by the temperature sensor of the sensor 410 and monitor the resolution of the display 450 during the unit times Z1-Z5 of FIG. 19.

It can be seen that the heat temperature 1911 of the terminal in the unit time section Z1 does not increase by more than set temperature (for example, 7° C.). In this case, the electronic device may maintain the current graphic load as it is without adjusting the graphic load. That is, the normal resolution may be maintained in the section Z1 as shown in FIG. 19.

However, it can be seen that the heat temperature 1911 of the terminal in the unit time section Z2 increases by more than the set temperature (for example, 7° C.). In addition, when it is assumed that an average value of the graphic load is higher than the graphic reference adjustment value, the electronic device may predict that the performance of the device will be degraded by the heat, and may prevent the performance degradation by changing the graphic load. When the performance of the electronic device is degraded, the electronic device may display information recommending the user to reduce the resolution on the display 450 as indicated by reference numeral 1930. That is, the electronic device provides the user with an option of changing the graphic load. When the user selects changing the resolution, the electronic device may adjust the graphic load of the electronic device, and, when the user does not select changing the resolution, the electronic device may maintain the current display resolution.

When the user selects changing the resolution, the electronic device may perform the graphic adjustment mode by reducing the resolution (for example, from QHD to FHD) in the section Z3. In addition, when the graphic adjustment mode is performed, the heat temperature 1911 of the terminal may decrease in the unit time section Z4. When the heat temperature 1911 is reduced by more than set temperature (for example, 6° C.), the electronic device may inform that the performance of the electronic device is restored, and display a message to receive selection on whether to restore the resolution through the display 450 as indicated by reference numeral 1970. When the user selects the restoration, the electronic device may restore the graphic load to the normal graphic load by applying the normal resolution (for example, increasing from HFD to QHD) in the unit time section Z5.

As indicated by reference numeral 1950, the user may set an auto resolution change mode in advance in case that the graphic load is changed. In this case, when the graphic load is changed, the resolution of the device may be changed without a user's specific input.

Figure 20:
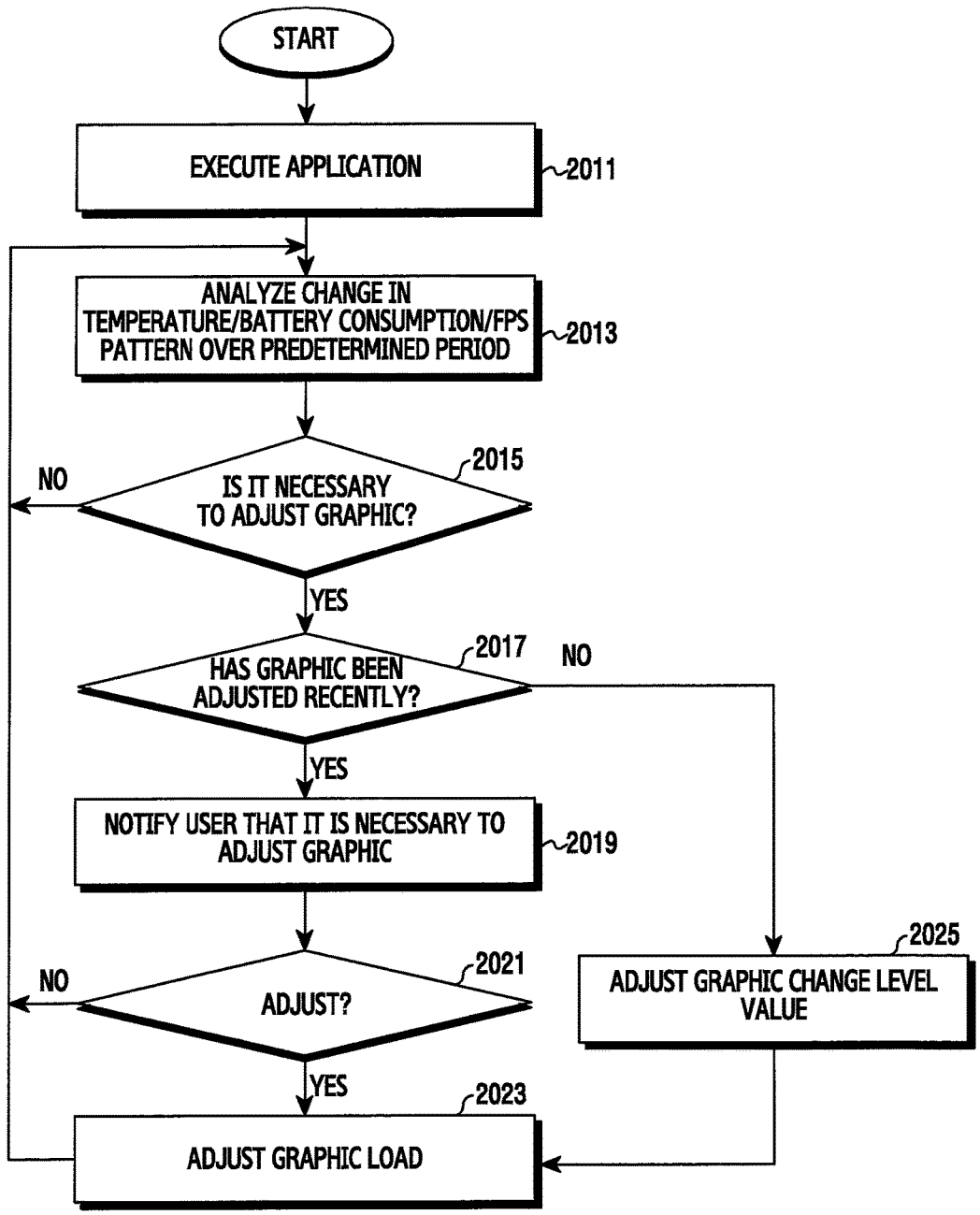
FIG. 20 is a flowchart illustrating a method for controlling a graphic load according to user's selection in the electronic device according to embodiments of the present disclosure.

FIG. 20 illustrates a flowchart illustrating a method for controlling a graphic load according to user's selection in the electronic device according to embodiments. The procedure shown in FIG. 20 may be performed through the processor 430 and the display 450 of the electronic device, and may be an operation which is processed in the monitoring unit 431 and the graphic processing unit 433 of the processor 430.

Referring to FIG. 20, when execution of a certain application is requested, the electronic device may execute the requested application in operation 2011. The electronic device may control the display operation of the application according to a graphic load value stored in the memory 470 when executing the application in operation 2011. The application may be an application having a high performance graphic processing function, such as a game, 3D contents, etc. After executing the application, the electronic device may monitor at least one factor which degrades the performance over a set time period (a unit time period) in operation 2013. Herein, the factor degrading the performance may be heat temperature, battery consumption, a change in FPS, or an active state of a background task of the device. The electronic device may monitor at least one of the above-described performance degradation factors in operation 2013. The monitoring method may be performed over the period of the unit time.

Thereafter, the electronic device may determine whether it is necessary to adjust the graphic in operation 2015. The determination is made based on whether a result value of the monitoring falls out of a set range or not. The set range may refer to a range in which a condition for shifting to a graphic adjustment mode is set. The electronic device may be shifted from the normal graphic processing mode to the graphic adjustment mode to reduce the graphic load value, when the result value of the monitoring falls out of the set range. In addition, the set range may refer to a range for restoring the graphic adjustment mode to the original graphic processing mode. When a result value of the monitoring detected in the graphic adjustment mode falls out of a range for maintaining the graphic adjustment mode, the electronic device may restore the graphic load value. When it is necessary to adjust the graphic, the electronic device may determine whether the graphic has been adjusted recently in operation 2017. When the graphic has been adjusted recently, the electronic device may adjust the graphic load by adjusting a graphic change level value according to a resolution table stored in the memory in operation 2025.

When the graphic has not been adjusted recently, the electronic device notifies the user that it is necessary to adjust the graphic. The notification method may be performed through the display 450 and/or a sound module. The electronic device may further include the sound module.

In operation 2021, the user may select whether to adjust the graphic in relation to the graphic adjustment situation notified by the display 450.

When the user selects graphic load adjustment, the electronic device may adjust the graphic load in operation 2023. The graphic load may be adjusted by changing the resolution of the display 450.

On the other hand, when the user selects maintaining the graphic load, the electronic device may resume operation 2013 to monitor the performance degradation factor again.

According to embodiments, when a system performance level should be reduced due to heat and power consumption of the electronic device, the electronic device and the operation method thereof may reduce a throughput from the visual aspect. Accordingly, the electronic device can solve heat and power consumption problems while minimizing performance degradation.

In addition, when the FPS of an application is changed, the electronic device may adjust the resolution to ensure a minimum FPS for driving the corresponding application. When the application is executed with an abnormal FPS, the electronic device can ensure an FPS greater than the minimum FPS for normally driving the corresponding application by adjusting the resolution.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a sensor;
   a display; and
   a processor configured to:
   display, on the display, a user interface of an application executing in a foreground state, wherein another application executing in a background state while displaying the user interface,
   identify, while displaying the user interface, that a request for using the another application on being executed in the background state, wherein the request occurred in the application executing in the foreground state, and
   change, in response the identification of the request, a resolution of the user interface being displayed on the display.

2. The electronic device of claim 1, wherein the processor is configured to:
   monitor a performance degradation factor using the sensor,
   analyze the performance degradation factor monitored during a unit time,
   in response to determining that the performance degradation factor is out of a set range, generate a display control signal, and control the resolution of the user interface of the application being displayed on the display according to the display control signal.

3. The electronic device of claim 2, wherein the sensor comprises a temperature sensor, and
wherein the processor is configured to:
detect, using the temperature sensor, a heat temperature of the electronic device as the performance degradation factor,
in response to determining that an increase in the heat temperature detected during the unit time is out of a set range, generate a display control signal to reduce a display resolution, and
reduce the resolution of the user interface of the application according to the display control signal.

4. The electronic device of claim 3, wherein the processor is configured to:
generate a display control signal to restore the resolution in response to determining that a decrease in the heat temperature detected during the unit time is out of a set range, and
increase the resolution by restoring the resolution of the user interface of the application according to the display control signal.

5. The electronic device of claim 2, wherein the sensor comprises a gauge sensor, and
wherein the processor is configured to:
detect battery consumption as the performance degradation factor,
in response to determining that a change in the battery consumption detected during the unit time is out of a set range, generate a display control signal to reduce the resolution of the display, and
reduce the resolution of the user interface of the application according to the display control signal.

6. The electronic device of claim 2, wherein the processor is configured to:
monitor a change in frame per second (FPS) of the application as the performance degradation factor,
in response to determining that the FPS detected during the unit time is less than minimum FPS, generate a display control signal to change the resolution of the display to display the application with a normal FPS, and
reduce the resolution of the user interface of the application according to the display control signal.

7. The electronic device of claim 2, wherein the processor is configured to:
monitor an operation of the another application as the performance degradation factor,
in response to determining that an activated another application influences the executed application, generate a display control signal to limit the resolution of the user interface of the application, and
reduce the resolution of the user interface of the application according to the display control signal.

8. The electronic device of claim 7, wherein the processor is configured to generate a display control signal to restore the resolution of the user interface of the application in response to determining that the activated another application is shifted to a suspend state.

9. The electronic device of claim 2, wherein the sensor comprises a temperature sensor and a gauge sensor, and
wherein the processor is configured to:
detect at least one factor of heat temperature, battery consumption, or a change in FPS using the sensor,
in response to determining that the detected at least one factor is out of a set range, generate a display control signal to reduce a display resolution, and
reduce the resolution of the user interface of the application according to the display control signal.

10. The electronic device of claim 9, wherein the processor is configured to:
change, in response to the identification of the request, a resolution of the user interface from a first resolution to a second resolution, wherein the second resolution is lower than the first resolution.

11. A method for operating an electronic device, the method comprising:
displaying, on a display of the electronic device, a user interface of an application executing in a foreground state, wherein another application is executing in a background state while displaying the user interface;
identifying, while displaying the user interface, that a request for using the another application executing in the background state, wherein the request occurs in the application executing in the foreground state; and
changing, in response to the identification of the request, a resolution of the user interface being displayed on the display.

12. The method of claim 11, the method further comprising:
detecting a heat temperature as a performance degradation factor;
in response to determining that an increase in the heat temperature detected during a unit time is out of a set range, generating a display control signal to reduce a display resolution; and
reducing a resolution of the user interface of the application according to the display control signal.

13. The method of claim 12, the method further comprising:
in response to determining that a decrease in the heat temperature detected during the unit time is out of a set range, generating a display control signal to restore the resolution of the display; and
increasing the resolution by restoring the resolution of the user interface of the application according to the display control signal.

14. The method of claim 11, the method further comprising:
detecting battery consumption as a performance degradation factor;
in response to determining that a change in the battery consumption detected during a unit time is out of a set range, generating a display control signal to reduce a display resolution; and
reducing a resolution of the user interface of the application according to the display control signal.

15. The method of claim 11, the method further comprising:
monitoring a change in FPS of the application as a performance degradation factor;
in response to determining that the FPS detected during a unit time is less than minimum FPS, generating a display control signal to change a resolution to display the application with a normal FPS; and
reducing a resolution of the user interface of the application according to the display control signal.

16. The method of claim 11, the method further comprising:
monitoring an operation of the another application as a performance degradation factor;

in response to determining that an activated background application influences the application, generating a display control signal to limit a resolution of the user interface of the application; and changing the resolution of the user interface of the application according to the display control signal, wherein the resolution is changed from a first resolution to a second resolution that is lower than the first resolution.

17. The method of claim 16, the method further comprising:

in response to determining that the activated background application is shifted to a suspend state, generating a display control signal to restore the resolution of the user interface of the application; and changing the resolution of the user interface of the application according to the display control signal from the second resolution to the first resolution.

18. The method of claim 11, the method further comprising:

detecting at least one factor of heat temperature, battery consumption, or a change in FPS as a performance degradation factors;

in response to determining that the detected at least one factor is out of a set range, generating a display control signal to reduce a display resolution; and limiting a resolution of the user interface of the application according to the display control signal.

19. The method of claim 18, the method further comprising: in response to determining that the performance degradation factor is restored, generating a display control signal to restore to a set display resolution of the user interface of the application.

20. The method of claim 11, wherein a graphic processing operation is executed and is configured to be performed according to selection performed by a user of the device.

* * * * *